(12) United States Patent
Maehara et al.

(10) Patent No.: US 8,794,213 B2
(45) Date of Patent: Aug. 5, 2014

(54) INTERNAL COMBUSTION ENGINE INCLUDING VALVE DEACTIVATION MECHANISM

(75) Inventors: Hayato Maehara, Saitama (JP);
Shunsuke Kitawaki, Saitama (JP);
Shinji Saito, Saitama (JP); Yukihiro Asada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 799 days.

(21) Appl. No.: 13/073,446

(22) Filed: Mar. 28, 2011

(65) Prior Publication Data
US 2011/0239987 A1 Oct. 6, 2011

(30) Foreign Application Priority Data

Mar. 31, 2010 (JP) ................. 2010-083394

(51) Int. Cl.
| F02D 13/02 | (2006.01) |
| F02D 17/02 | (2006.01) |
| F02D 1/18 | (2006.01) |
| F01L 9/02 | (2006.01) |

(52) U.S. Cl.
CPC ............... *F02D 13/02* (2013.01); *F02D 17/02* (2013.01); *F01L 9/02* (2013.01)
USPC .................. 123/406.46; 123/90.12

(58) Field of Classification Search
CPC ........... F02D 13/02; F02D 17/02; F02D 1/18; F01L 9/02
USPC ........ 123/406.46, 406.47, 90.1, 90.11, 90.12; 701/102, 105, 115
See application file for complete search history.

(56) References Cited

U.S. PATENT DOCUMENTS

| 5,564,385 | A | * | 10/1996 | Hakansson ................... 123/321 |
| 6,688,275 | B2 | * | 2/2004 | Shindou et al. ............ 123/198 F |
| 7,403,849 | B1 | * | 7/2008 | Watanabe et al. ............. 701/102 |
| 7,584,044 | B2 | * | 9/2009 | Mladenovic et al. ......... 701/102 |
| 7,992,541 | B2 | * | 8/2011 | Petridis et al. ................ 123/347 |
| 2012/0310511 | A1 | * | 12/2012 | Wakaya et al. ............... 701/105 |

FOREIGN PATENT DOCUMENTS

| JP | 08-105337 A | 4/1996 |
| JP | 9-256879 A | 9/1997 |
| JP | 10-103097 A | 4/1998 |
| JP | 2012207548 A | * | 10/2012 | ............. F02D 13/02 |

* cited by examiner

*Primary Examiner* — Hieut Vo
(74) *Attorney, Agent, or Firm* — Birch, Stewart, Kolasch & Birch, LLP

(57) ABSTRACT

An internal combustion engine which includes a valve deactivation mechanism for reducing an output power shock upon changing of the cylinder number. In an internal combustion engine which includes a valve deactivation mechanism driven by a slide pin which is driven by hydraulic pressure, response delay time after a signal is sent to oil control valves until an intake valve and an exhaust valve are activated or deactivated is used to form a control map in response to control parameters, and the valve deactivation mechanism is controlled based on the control map.

20 Claims, 10 Drawing Sheets

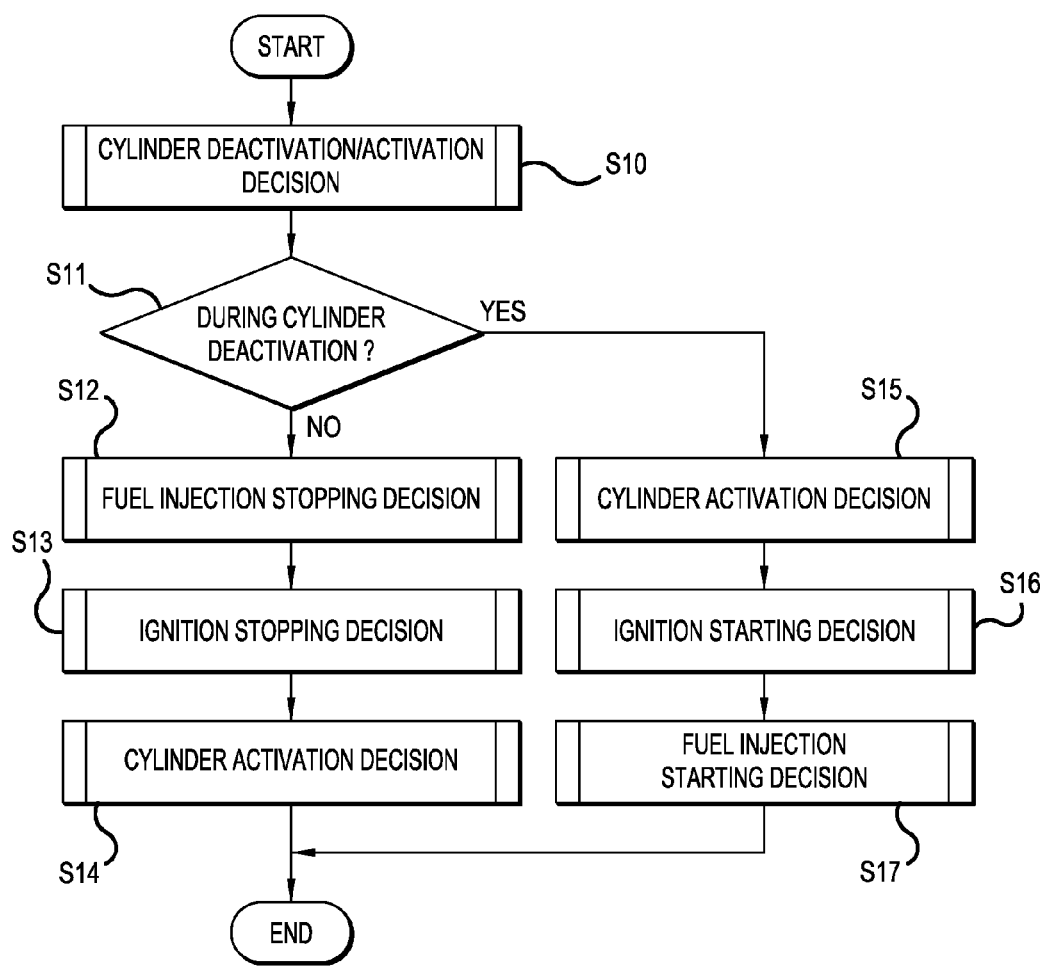

INTERNAL COMBUSTION ENGINE INCLUDING VALVE DEACTIVATION MECHANISM

CROSS-REFERENCE TO RELATED APPLICATIONS

The present application claims priority under 35 USC 119 to Japanese Patent Application No. 2010-083394 filed on Mar. 31, 2010 the entire contents of which are hereby incorporated by reference.

BACKGROUND OF THE INVENTION

1. Field of the Invention

This invention relates to an internal combustion engine including a valve deactivation mechanism.

2. Description of Background Art

An internal combustion engine including a valve deactivation mechanism is conventionally known wherein the valve deactivation mechanism is driven by hydraulic pressure to control an intake valve and an exhaust valve of the internal combustion engine. See, for example, Japanese Patent Laid-Open No. Hei 9-256879.

In addition, in an engine which uses a variable valve motion which uses hydraulic pressure, an oil control valve such as a spool valve is normally used in order to control the hydraulic pressure.

More particularly, in a cylinder deactivation engine including a valve deactivation mechanism, when the activation cylinder number is to be changed in response to an engine load, some interval of time is required after a driving instruction signal is outputted from an ECU to an oil control valve or the like until a hydraulic pressure necessary for the driving of a variable valve motion system is reached, and this provides a response delay.

If a cylinder deactivation/activation procedure does not take this response delay time into consideration, then an output power variation occurs when the activation cylinder number is changed, and there is a problem that an output power shock occurs.

SUMMARY AND OBJECTS OF THE INVENTION

Therefore, it is an object of an embodiment of the present invention to drive, in an internal combustion engine which includes a valve deactivation mechanism which is driven by hydraulic pressure to change the number of cylinders, the valve deactivation mechanism to reduce an output power shock upon changing of the cylinder number.

In order to attain the object described above, according to an embodiment of the present invention, an internal combustion engine (10) which includes a valve deactivation mechanism (80) driven by a hydraulic actuator (86) which is driven by hydraulic pressure includes a response delay time after a signal is sent to oil control valves (75a, 75b) until intake and exhaust valves (11, 12) are activated or deactivated that is used to form a control map in response to control parameters, and the valve deactivation mechanism is controlled based on the control map.

According to the configuration described above, since the valve deactivation mechanism is controlled based on the control map, the intake and the exhaust valves are activated or deactivated simply, readily and rapidly at optimum timings taking a response delay time into consideration after a signal is sent to the oil control valve until the intake and exhaust valves are activated or deactivated.

Accordingly, the valve deactivation mechanism can be driven to reduce an output power shock upon change of the cylinder number with certainty.

In this instance, the control parameters may include the temperature of controlling oil, and the response delay time may be calculated from the control map to delay the ignition timing or the fuel injection time.

According to the configuration described above, the ignition timing or the fuel injection timing can be delayed to an optimum timing based on the control map in which the temperature of the controlling oil is used as a control parameter taking the response delay time into consideration until the intake and exhaust valves are activated or deactivated. Therefore, the valve deactivation mechanism can be driven to reduce an output power shock upon change of the cylinder number with certainty.

The control parameters may include the pressure of controlling oil, and the response delay time may be calculated from the control map to delay the ignition timing or the fuel injection time.

According to the configuration described above, the ignition timing or the fuel injection timing can be delayed to an optimum timing based on the control map in which the pressure of the controlling oil is used as a control parameter taking the response delay time into consideration until the intake and exhaust valves are activated or deactivated. Therefore, the valve deactivation mechanism can be driven to reduce an output power shock upon change of the cylinder number with certainty.

The control parameters may include the engine speed, and the response delay time may be calculated from the control map to delay the ignition timing or the fuel injection time.

According to the configuration described above, the ignition timing or the fuel injection timing can be delayed to an optimum timing based on the control map in which the engine speed is used as a control parameter taking the response delay time until the intake and exhaust valves are activated or deactivated into consideration. Therefore, the valve deactivation mechanism can be driven to reduce an output power shock upon change of the cylinder number with certainty.

The control parameters may include the temperature of controlling oil and the pressure of the controlling oil or the engine speed, and the response delay time may be calculated from the control map to delay the ignition timing or the fuel injection time.

According to the configuration described above, the ignition timing or the fuel injection timing can be delayed to an optimum timing based on the control map in which the temperature of controlling oil and the pressure of the controlling oil or the engine speed are used as control parameters taking the response delay time into consideration until the intake and exhaust valves are activated or deactivated. Therefore, the valve deactivation mechanism can be driven to reduce an output power shock upon change of the cylinder number with certainty.

According to an embodiment of the present invention, since the intake and the exhaust valves are activated or deactivated at optimum timings based on the control map which takes response delay time after a signal is sent to the oil control valve until the intake and exhaust valves are activated or deactivated into consideration, the valve deactivation mechanism can be driven to reduce an output power shock upon change of the cylinder number.

Further, since the ignition timing or the fuel injection timing is delayed to an optimum timing based on the control map in which the temperature of the controlling oil is used as a control parameter, the valve deactivation mechanism can be driven to reduce an output power shock upon change of the cylinder number.

Further, since the ignition timing or the fuel injection timing is delayed to an optimum timing based on the control map in which the pressure of the controlling oil is used as a control parameter, the valve deactivation mechanism can be driven to reduce an output power shock upon change of the cylinder number.

Further, since the ignition timing or the fuel injection timing is delayed to an optimum timing based on the control map in which the engine speed is used as a control parameter, the valve deactivation mechanism can be driven to reduce an output power shock upon change of the cylinder number.

Further, since the ignition timing or the fuel injection timing is delayed to an optimum timing based on the control map in which the temperature of controlling oil and the pressure of the controlling oil or the engine speed are used as control parameters, the valve deactivation mechanism can be driven to reduce an output power shock upon change of the cylinder number.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a processing flow chart of cylinder deactivation/activation control;

DETAILED DESCRIPTION OF THE PREFERRED EMBODIMENTS

In the following, an embodiment of the present invention is described with reference to the drawings.

Figure 1:
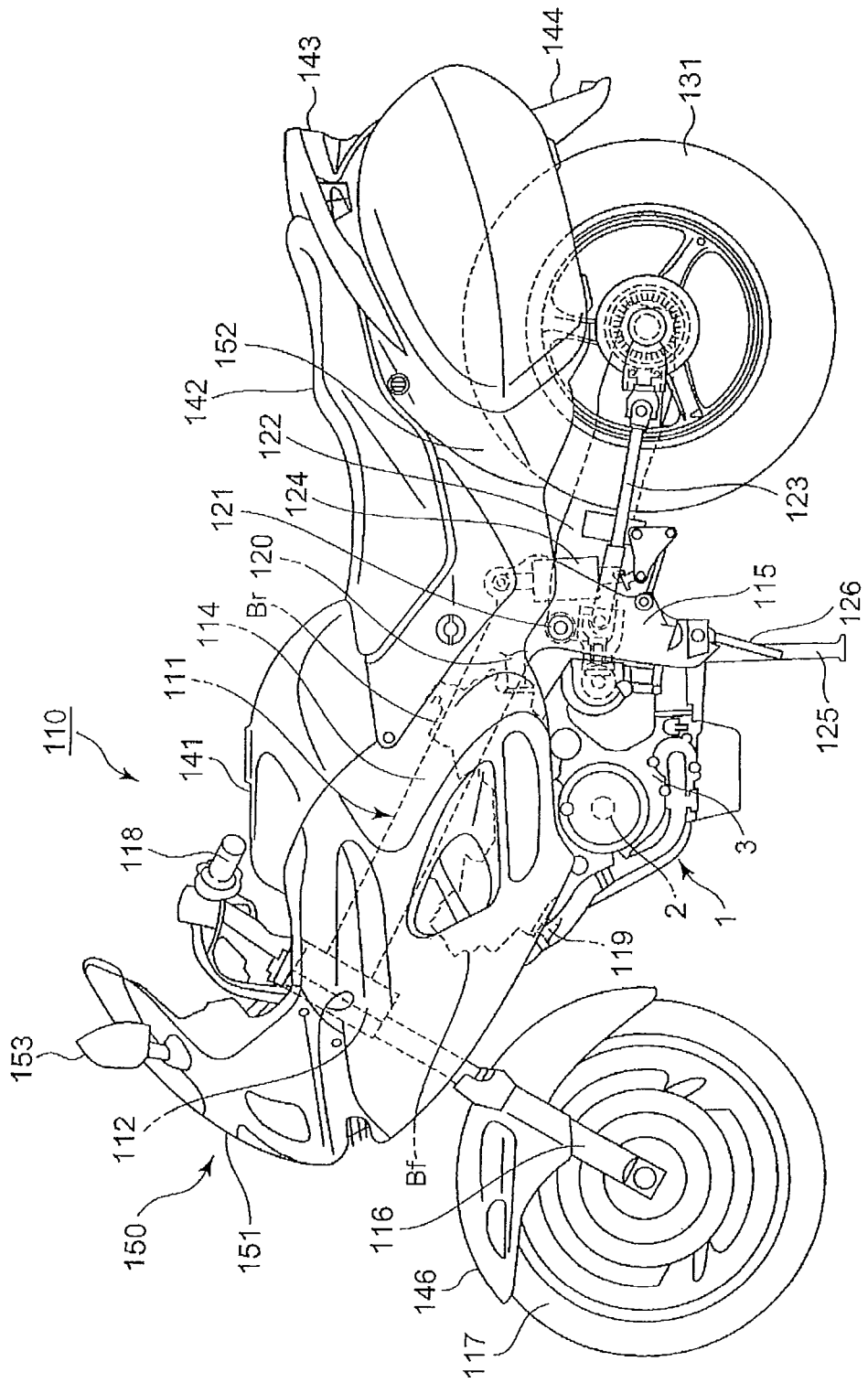
FIG. 1 is a left side elevational view showing a motorcycle which includes an internal combustion engine according to an embodiment of the present invention.

FIG. 1 is a left side elevational view showing a motorcycle which includes an internal combustion engine according to an embodiment of the present invention. It is to be noted that, in the following description, a term regarding a direction such as a forward, backward, leftward, rightward, upward or downward direction is used to represent a direction with reference to a vehicle body.

A vehicle body frame 111 of a motorcycle 110 includes a head pipe 112 positioned at a front portion of a vehicle body, a pair of left and right main frames 114 extending rearwardly from the head pipe 112 to the middle of the vehicle body, a pair of left and right pivot plates 115 extending downwardly from rear end portions of the main frames 114, and a rear frame (not shown) extending from rear end portions of the main frames 114 to a rear portion of the vehicle body.

A front fork 116 is attached for turning motion to the head pipe 112, and a front wheel 117 is supported for rotation at a lower end of the front fork 116. A steering handle bar 118 is attached to an upper portion of the head pipe 112.

A longitudinal V-type four-cylinder internal combustion engine 1 is disposed below the main frames 114. This internal combustion engine 1 is an engine of transversely mounted arrangement wherein a crankshaft 2 is directed in a horizontal leftward and rightward direction and is of the OHC four-stroke water-cooled type. Further, the internal combustion engine 1 includes a crankcase 3 and is a narrow angle V-type engine wherein a front side bank Bf and a rear side bank Br each including two cylinders and inclined forwardly and rearwardly from the crankcase 3 are mounted in a V shape such that the bank angle between the front side bank Bf and the rear side bank Br is smaller than 90 degrees.

A pair of left and right exhaust pipes 119 are connected at one end thereof to exhaust ports of the front side bank Bf. The exhaust pipes 119 extend from the exhaust ports to the lower side and then are laid toward the rear of the vehicle body, and then are connected and joined together to another pair of left and right exhaust pipes 120 extending from exhaust ports of the rear side bank Br such that they are connected to a muffler (not shown) provided rearwardly of the internal combustion engine 1 through a single exhaust pipe 127 (refer to FIG. 3).

A pivot shaft 121 is provided rearwardly of the internal combustion engine 1, and a rear fork 122 is attached on the pivot shaft 121 for rocking motion in upward and downward directions around the pivot shaft 121. A rear wheel 131 is supported for rotation at a rear end portion of the rear fork 122. The rear wheel 131 and the internal combustion engine 1 are connected to each other by a drive shaft 123 provided in the rear fork 122 so that rotational power from the internal combustion engine 1 is transmitted to the rear wheel 131 through the drive shaft 123. Further, a rear shock absorber 124 for absorbing an impact from the rear fork 122 extends between the rear fork 122 and the vehicle body frame 111.

A stand 125 for stopping the vehicle body is provided at a rear portion of the internal combustion engine 1. Further, a side stand 126 is provided at a lower portion of a left side face of the internal combustion engine 1.

A fuel tank 141 is mounted at an upper portion of the main frames 114 in such a manner so as to cover the internal combustion engine 1 from above. A seat 142 is positioned rearwardly of the fuel tank 141 and supported on the rear frame described hereinabove. A tail lamp 143 is disposed rearwardly of the seat 142, and a rear fender 144 for covering the rear wheel 131 from above is disposed below the tail lamp 143.

Further, the motorcycle 110 has a vehicle body cover 150 made of resin for covering the vehicle body. The vehicle body cover 150 includes a front cover 151 which continuously covers from forwardly of the vehicle body frame 111 to a front portion of the internal combustion engine 1, and a rear cover 152 for covering the seat 142 from below. A pair of left and right mirrors 153 is attached to an upper portion of the front cover 151. Further, a front fender 146 which covers the front wheel 117 from above is attached to the front fork 116.

Figure 2:
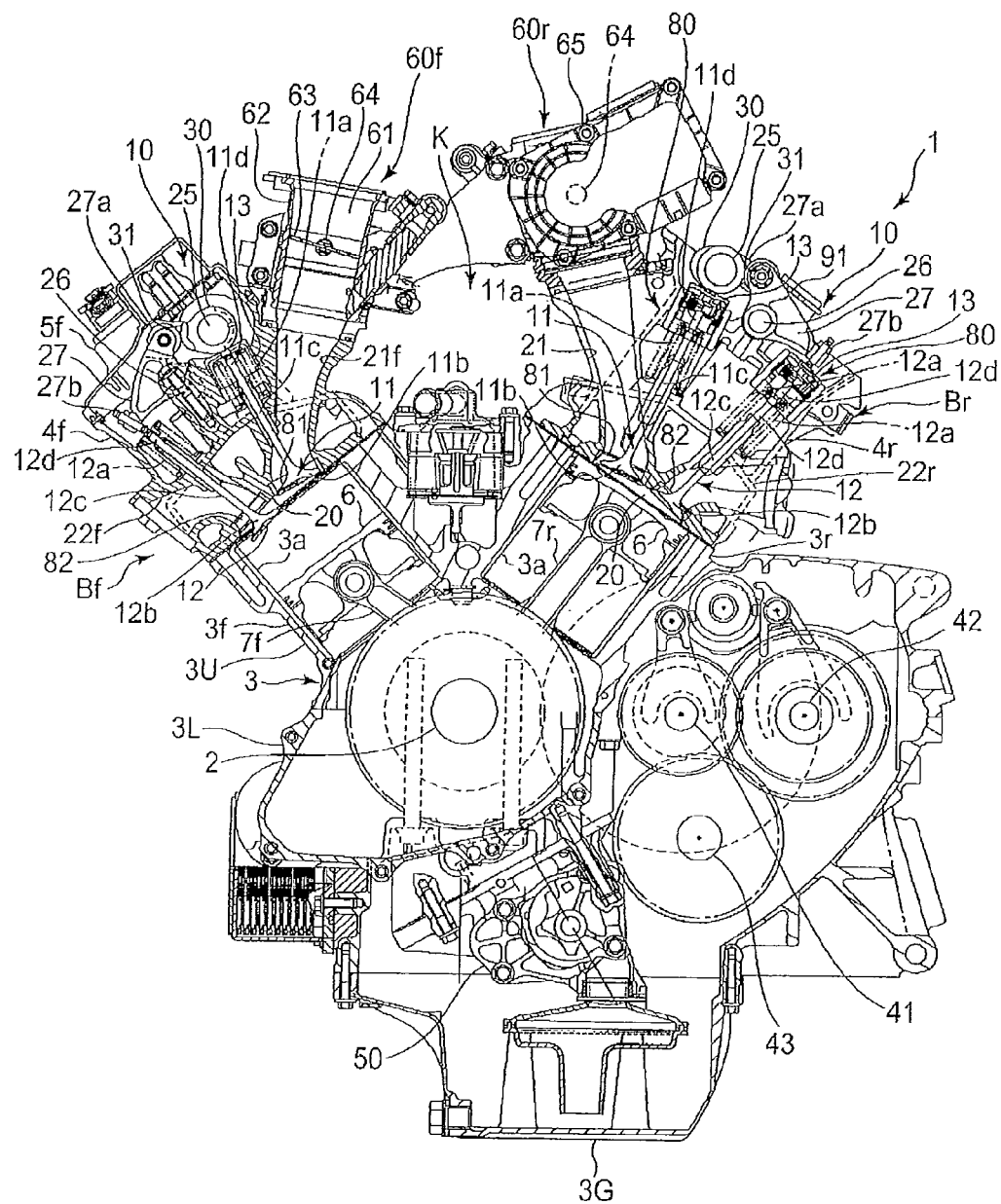
FIG. 2 is a sectional view showing the internal combustion engine.
Figure 3:
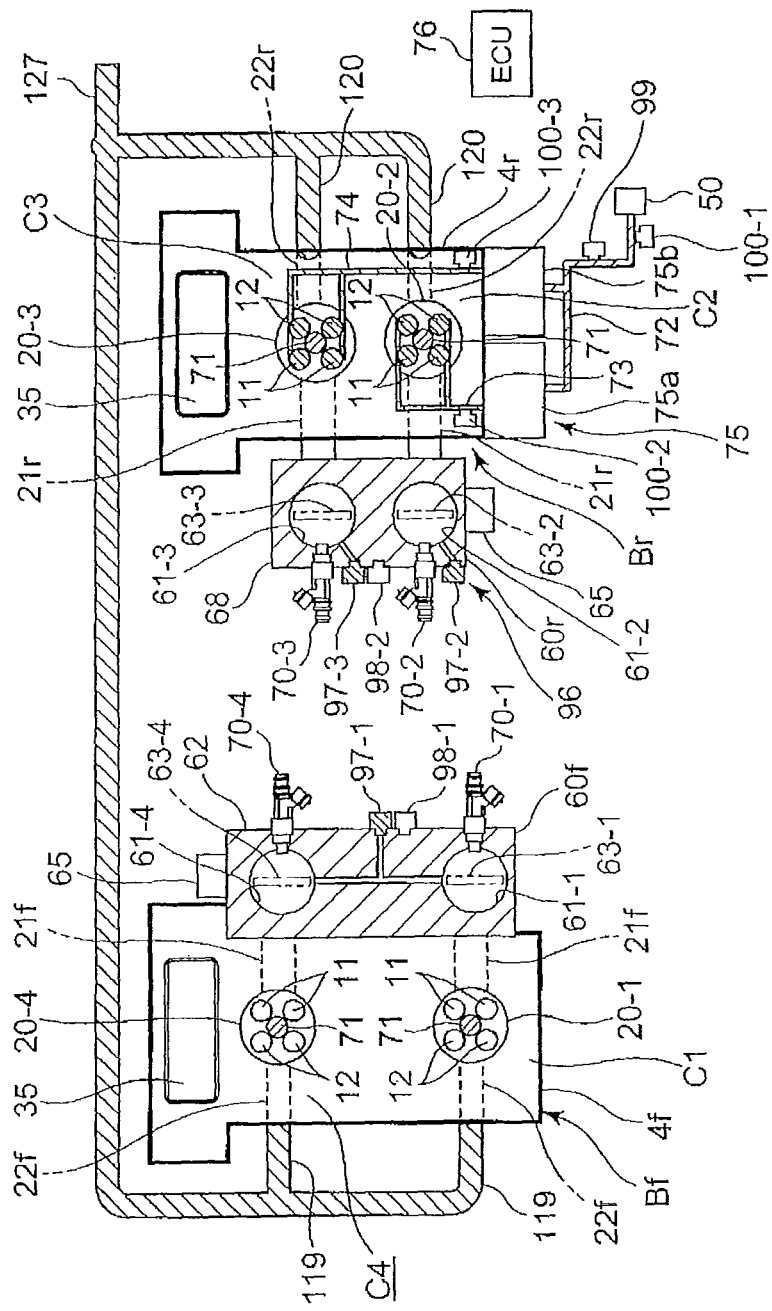
FIG. 3 is a view showing a configuration of the internal combustion engine as viewed from above.

FIG. 2 is a sectional view showing the internal combustion engine 1. FIG. 3 is a schematic view showing a configuration of the internal combustion engine 1 as viewed from above. It is to be noted that, in the description given below with reference to FIG. 2, the upward and downward directions are the upward and downward directions of the internal combustion engine 1, and the left side of the figure is the front side of the internal combustion engine 1 while the right side of the figure is the rear side of the internal combustion engine 1.

As shown in FIG. 2, a V bank space K which is a space formed in a V shape as viewed in side elevation is formed between the front side bank Bf and the rear side bank Br.

The crankcase 3 is configured in a vertical parting configuration and has an upper crankcase 3U and a lower crankcase 3L. The crankshaft 2 is supported for rotation in such a manner so as to be sandwiched by the crankcases 3U and 3L, and a front cylinder block 3f and a rear cylinder block 3r in which two cylinders are arrayed on each of the left and the right are formed integrally on the upper crankcase 3U such that they extend obliquely upwardly so as to form a V shape as viewed in side elevation.

An oil pan 3G in which oil for the internal combustion engine 1 is reserved is provided at a lower portion of the lower crankcase 3L in such a manner so as to be swollen downwardly. An oil pump 50 for pumping oil to circulate in the internal combustion engine 1 is positioned below the crankshaft 2 in the lower crankcase 3L.

A main shaft 41, a countershaft 42 and an output power shaft 43, which are disposed in parallel to the crankshaft 2, are provided in the crankcase 3. The shafts 41, 42 and 43 including the crankshaft 2 configure a gear transmission mechanism for transmitting rotation of the crankshaft 2 in the order of the main shaft 41, countershaft 42 and output power shaft 43. A speed change gear train for six gears is disposed between and over the countershaft 42 and the main shaft 41, and a transmission is configured from them. The drive shaft 123 (refer to FIG. 1) is connected to the output power shaft 43 through a bevel gear (not shown).

A front cylinder head 4f is placed in an overlapping relationship at an obliquely forwardly upward position on the front cylinder block 3f and fastened to the front cylinder block 3f by a fastening bolt (not shown), and a front cylinder head cover 5f covers the front cylinder head 4f from above. Similarly, a rear cylinder head 4r is placed in an overlapping relationship at an obliquely rearwardly upward position on the rear cylinder block 3r and fastened to the rear cylinder block 3r by a fastening bolt (not shown), and the rear cylinder head 4r is covered with a rear cylinder head cover (not shown).

A pair of cylinder bores 3a is formed in each of the front cylinder block 3f and the rear cylinder block 3r. A piston 6 is accommodated in each of the cylinder bores 3a such that it makes back and forth movement in the cylinder bore 3a. Each piston 6 is connected to a single common crankshaft 2 through a connecting rod 7f or 7r.

As shown in FIG. 3, in the internal combustion engine 1, a first cylinder C1, a second cylinder C2, a third cylinder C3 and a fourth cylinder C4 in each of which a piston 6 is accommodated are provided. In particular, the left side cylinder of the front side bank Bf is the first cylinder C1 and the right side cylinder of the front side bank Bf is the fourth cylinder C4 while the left side cylinder of the rear side bank Br is the second cylinder C2 and the right side cylinder of the rear side bank Br is the third cylinder C3.

As shown in FIGS. 2 and 3, combustion chambers 20-1 to 20-4 individually positioned above the four cylinder bores 3a are provided on the front cylinder head 4f and the rear cylinder head 4r. On the front cylinder head 4f, an intake port 21f and an exhaust port 22f are provided communicating with the combustion chamber 20-1 of the first cylinder C1 and an intake port 21f and an exhaust port 22f communicating with the combustion chamber 20-4 of the fourth cylinder C4.

On the rear cylinder head 4r, an intake port 21r and an exhaust port 22r are provided communicating with the combustion chamber 20-2 of the second cylinder C2 and an intake port 21r and an exhaust port 22r communicating with the combustion chamber 20-3 of the third cylinder C3.

To the intake ports 21f, 21f of the front cylinder head 4f, a front side throttle body 60f is connected for adjusting the amount of intake air to flow to the intake ports 21f, 21f, and to the intake ports 21r, 21r of the rear cylinder head 4r, a rear side throttle body 60r is connected for adjusting the amount of intake air to flow to the intake ports 21r, 21r.

As shown in FIG. 2, on a combustion recess 20A which forms an upper face of each of the combustion chambers 20-1 to 20-4 of the cylinders, a pair of intake valve openings 81 and a pair of exhaust valve openings 82 are formed. The intake valve openings 81 are opened and closed by intake valves 11 (valves) while the exhaust valve openings 82 are opened and closed by exhaust valves 12 (valves).

Each of the intake valves 11 has a valve body portion 11b for closing up a corresponding intake valve opening 81, and a valve stem 11c extending from the valve body portion 11b serving as a base end. Each of the exhaust valves 12 has a valve body portion 12b for closing up a corresponding exhaust valve opening 82 and a valve stem 12c extending from the valve body portion 12b serving as a base end.

The valve stem 11c and the valve stem 12c are fitted for sliding movement in guide tubes 83 provided above the intake valve opening 81 and the exhaust valve opening 82.

A retainer 84 is provided at each of valve stem ends 11d and 12d at ends of the valve stem 11c and the valve stem 12c. A valve spring 11a and a valve spring 12a each in the form of a coil spring are provided between the retainers 84 and the intake valve opening 81 and exhaust valve opening 82 and bias the intake valve 11 and the exhaust valve 12 in their closing direction, respectively.

The intake valves 11 and the exhaust valves 12 are driven to open and close by a valve motion 10 of the unitary cam type which is driven by a camshaft 25 disposed in a one by one corresponding relationship to each of the cylinder heads 4f and 4r.

The valve motion 10 has a camshaft 25 supported for rotation at supporting portions above the intake valves 11 in each of the cylinder heads 4f and 4r, a rocker shaft 26 secured to the cylinder head 4f or 4r and having an axial line parallel to the camshaft 25, and a rocker arm 27 supported for pivotal motion on the rocker shaft 26.

The camshaft 25 has intake cams 30 and exhaust cams 31 projecting to the outer circumference side thereof and is rotated in synchronism with rotation of the crankshaft 2. Each of the intake cams 30 and the exhaust cams 31 has a cam profile which does not exhibit a fixed distance (radius) from the center to an outer periphery thereof such that the intake valves 11 and the exhaust valves 12 are moved upwardly and downwardly in accordance with the variation in radius when the intake cams 30 and the exhaust cams 31 rotate.

A valve lifter 13 is provided between the camshaft 25 and each intake valve 11 and is fitted for sliding movement in each of the cylinder heads 4f and 4r below the camshaft 25.

A roller 27a for rolling contact with the exhaust cam 31 is provided at one end of the rocker arm 27 supported for rocking motion on the rocker shaft 26, and a tappet screw 27b for contacting with an upper end of the exhaust valve 12 is provided for adjustment between advanced and retracted positions at the other end of the rocker arm 27. The valve lifter 13 is provided between the tappet screw 27b and the exhaust valve 12 on the rear side bank Br side.

If the intake cams 30 and the exhaust cams 31 integrated with the camshafts 25 rotate, then the intake cams 30 push down the intake valves 11 through the valve lifters 13 while the exhaust cams 31 which contact with the rollers 27a push down the exhaust valves 12 through the rocker arms 27. Consequently, the intake ports 21f and 21r and the exhaust ports 22f and 22r are opened and closed at predetermined timings which are determined by the phase of rotation of the intake cams 30 and the exhaust cams 31.

As shown in FIG. 3, the front side throttle body 60f is provided at a rear portion of the front side bank Bf and is configured such that a pair of intake paths 61-1 and 61-4 communicating with the first cylinder C1 and the fourth cylinder C4, respectively, are provided on a single case body 62. A throttle valve 63-1 of the butterfly type is provided for opening and closing motion for the intake path 61-1 while a throttle valve 63-4 of the butterfly type is provided for opening and closing motion for the intake path 61-4.

The throttle valves 63-1 and 63-4 are supported by shafts 64 provided in the intake paths 61-1 and 61-4. The shafts 64 are driven by a single motor 65 connected thereto, and the throttle valves 63-1 and 63-4 are driven simultaneously. In other words, the throttle valves 63-1 and 63-4 are throttle valves common to the front side bank Bf which are driven simultaneously by the single motor 65.

The rear side throttle body 60r is provided at a front portion of the rear side bank Br and is configured such that a pair of intake paths 61-2 and 61-3 communicating with the second cylinder C2 and the third cylinder C3, respectively, are provided in a single case body 68. A throttle valve 63-2 of the butterfly type is provided for opening and closing movement in the intake path 61-2 while a throttle valve 63-3 of the butterfly type is provided for opening and closing movement in the intake path 61-3. The throttle valves 63-2 and 63-3 are supported by shafts 64 provided in the intake paths 61-2 and 61-3. The shafts 64 are driven by a single motor 65 connected to the shafts 64, and the two throttle valves 63-2 and 63-3 are driven simultaneously. In other words, the throttle valves 63-2 and 63-3 are throttle valves common to the rear side bank Br which are driven simultaneously by the single motor 65.

The throttle valves 63-1 to 63-4 are throttle valves of the so-called TBW (throttle by wire) type which carry out opening and closing movement by electronic control in linkage with the motors 65 in response to the accelerator opening operated by a driver, that is, in response to an acceleration will of the driver or the like. The driving state of each of the motors 65 is controlled in response to the accelerator opening or the like by an ECU 76 as an electronic control unit of the vehicle.

In the present embodiment, the throttle valves 63-1 and 63-4 of the front side bank Bf are driven under common control by one motor 65 while the throttle valves 63-2 and 63-3 of the rear side bank Br are driven under common control by a different one motor 65. Since throttle valves independent of each other are not provided for individual ones of the four cylinders, the intake system can be configured in a simple structure.

A first injector 70-1 for injecting fuel into the intake path 61-1 is provided for the intake path 61-1, and a second injector 70-2 for injecting fuel into the intake path 61-2 is provided for the intake path 61-2. Further, a third injector 70-3 for injecting fuel into the intake path 61-3 is provided for the intake path 61-3, and a fourth injector 70-4 for injecting fuel into the intake path 61-4 is provided for the intake path 61-4.

The first injector 70-1 is disposed on the downstream side of the throttle valve 63-1 and the second injector 70-2 is disposed on the downstream side of the throttle valve 63-2 while the third injector 70-3 is disposed on the downstream side of the throttle valve 63-3 and the fourth injector 70-4 is disposed on the downstream side of the throttle valve 63-4.

In the middle of the combustion chamber 20-1, a first ignition plug 71-1 is provided for igniting fuel air mixture supplied into the combustion chamber 20-1, and in the middle of the combustion chamber 20-2, a second ignition plug 71-2 is provided for igniting fuel air mixture supplied into the combustion chamber 20-2. Further, in the middle of the combustion chamber 20-3, a third ignition plug 71-3 is provided for igniting fuel air mixture supplied into the combustion chamber 20-3, and in the middle of the combustion chamber 20-4, a fourth ignition plug 71-4 is provided for igniting fuel air mixture supplied into the combustion chamber 20-4.

Further, a cam chain chamber 35 extending upwardly and downwardly is provided at a right end portion of each of the front side bank Bf and the rear side bank Br. The camshaft 25 is driven to rotate by a cam chain (not shown) which passes through the cam chain chamber 35 and is driven by the crankshaft 2.

In the present embodiment, a valve deactivation mechanism 80 (variable valve motion) for keeping an intake valve 11 and an exhaust valve 12 in a closed state to deactivate the cylinder is provided on the rear side bank Br. The valve deactivation mechanism 80 is provided, on the intake side, between the valve stem end 11d of the intake valve 11 and the intake cam 30, but on the exhaust side, between the valve stem end 12d of the exhaust valve 12 and the tappet screw 27b of the rocker arm 27.

The valve deactivation mechanism 80 can carry out changeover between operative and inoperative states of the pressing force in the valve opening direction from the intake cam 30 to the intake valve 11 and between operative and inoperative states of the pressing force in the valve opening direction from the rocker arm 27 to the exhaust valve 12. Thus, in a particular operation region of the internal combustion engine 1, for example, in a low load region such as, for example, a low speed operation region, the valve deactivation mechanism 80 places the pushing force into an inoperative state to place the intake valve 11 and the exhaust valve 12 into a deactivated state. In other words, the valve deactivation mechanism 80 is a variable valve motion which can carry out changeover of whether or not the intake valve 11 and the exhaust valve 12 should be rendered operative.

Figure 4:
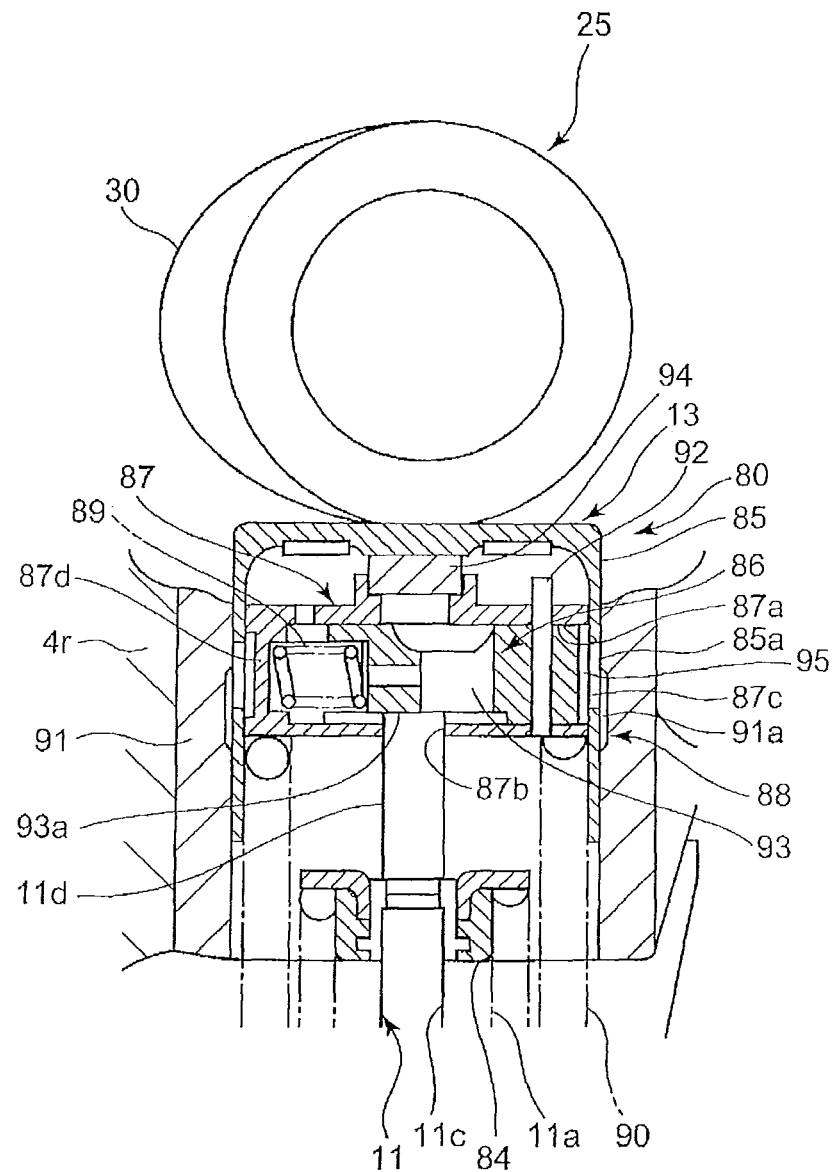
FIG. 4 is an enlarged sectional view of a valve deactivation mechanism on the intake side.

FIG. 4 is an enlarged sectional view of the valve deactivation mechanism 80 on the intake side.

Since both of the valve deactivation mechanisms 80 on the intake side and the exhaust side have a similar configuration, principally the valve deactivation mechanism 80 on the intake side is described hereinafter. Further, since the valve deactivation mechanism 80 is provided for each of the second cylinder C2 and the third cylinder C3 and the valve deactivation mechanisms 80 have the same configuration, the valve deactivation mechanism 80 for the second cylinder C2 is described hereinafter.

As shown in FIG. 4, the valve deactivation mechanism 80 is provided in the valve lifter 13 and includes a lifter 85 slidably movable upwardly and downwardly in the axial direction of the valve stem 11c (on the exhaust side, of the valve stem 12c) by pressing force from the camshaft 25, a slide pin 86 (engaging pin; hydraulic actuator) slidably movable in a direction perpendicular to the axial direction of the valve stem end 11d, a slide pin holder 87 for holding the slide pin 86, a hydraulic feeding mechanism 88 for causing hydraulic pressure to act upon the slide pin 86, a return spring 89 for biasing the slide pin 86 against the hydraulic pressure applied to the slide pin 86 and a biasing spring 90 for biasing the lifter 85 against the pressure force from the camshaft 25.

The lifter 85 is configured in a cylindrical shape whose top end in an axial direction is formed as a flat face and is open at a lower face thereof, and the disk-like slide pin holder 87 is accommodated in the inside of the lifter 85. A communicating hole 85a for communicating the inner and outer sides of the lifter 85 with each other therethrough is formed on the outer periphery of the lifter 85.

The lifter 85 is supported for sliding motion in a cylindrical lifter supporting portion 91 provided at an upper portion of the rear cylinder head 4r. An oil supplying groove 91a is formed on an inner circumference of the lifter supporting portion 91 in such a manner as to surround the lifter 85.

The hydraulic feeding mechanism 88 includes an oil pump 50 (refer to FIG. 2) for delivering working fluid, an oil path 72 (refer to FIG. 3) connected to the oil pump 50, controlling oil paths 73 and 74 branched from the oil path 72 to the second cylinder C2 and the third cylinder 3C, a hydraulic pressure changeover section 75 for changing over the working fluid to flow to the controlling oil paths 73 and 74, and the oil supplying groove 91a positioned at the terminal end of the controlling oil paths 73 and 74.

An oil temperature sensor 99 for detecting the temperature of the oil in the oil path 72 and a first hydraulic pressure sensor 100-1 for detecting the hydraulic pressure in the oil path 72 are provided for the oil path 72. A second hydraulic pressure sensor 100-2 for detecting the hydraulic pressure in the controlling oil path 73 is provided for the controlling oil path 73, and a third hydraulic pressure sensor 100-3 for detecting the hydraulic pressure in the controlling oil path 74 is provided for the controlling oil path 74.

Further, the hydraulic pressure changeover section 75 includes a first spool valve 75a for changing over ON/OFF of the hydraulic pressure of the working fluid to be supplied to the valve deactivation mechanism 80 of the second cylinder C2 and a second spool valve 75b for changing over ON/OFF of the hydraulic pressure of the working fluid to be supplied to the valve deactivation mechanism 80 of the third cylinder C3. Changeover between the first spool valve 75a and the second spool valve 75b is controlled by the ECU 76 based on a driving situation of the vehicle such as the speed of the internal combustion engine 1 (engine speed).

As shown in FIG. 4, the slide pin holder 87 has a cylinder hole 87a extending in a diametrical direction of the disk shape thereof and formed so as to be directed in a direction perpendicular to the valve stem 11c, and a stem hole 87b provided coaxially with the valve stem 11c at the center of the slide pin holder 87. An opening 87c is provided at an end of the cylinder hole 87a, and a wall portion 87d is formed at the other end of the cylinder hole 87a. Further, a stopper pin 92 for regulating the position of the slide pin 86 in the cylinder hole 87a is provided on the opening 87c side of the cylinder hole 87a.

Further, a shim 94 for adjustment of the tappet clearance is interposed between the upper face of the slide pin holder 87 and a pressing target face of the lifter 85. The biasing spring 90 is provided in contact with the lower face of the slide pin holder 87.

The slide pin 86 is provided for sliding motion in the cylinder hole 87a and has an escape hole 93 formed such that it extends therethrough in a direction perpendicular to the axial direction thereof. Further, the slide pin 86 has a receiving portion 93a having an outer periphery depressed toward the inner side. The receiving portion 93a is provided continuously to the escape hole 93. In the cylinder hole 87a, a space between the end of the slide pin 86 and the lifter 85 serves as a hydraulic pressure chamber 95 which is acted upon by the working fluid.

The return spring 89 is provided between the other end of the slide pin 86 and the wall portion 87d of the cylinder hole 87a, and, as seen in FIG. 4, the return spring 89 biases the slide pin 86 to the hydraulic pressure chamber 95 side. The position of the slide pin 86 in the axial direction is regulated by the stopper pin 92 fitted in a grooved portion provided on the end side. In a state in which the slide pin 86 is pressed against the stopper pin 92 side, the escape hole 93 is positioned on the hydraulic pressure chamber 95 side with respect to the stem hole 87b.

If the working fluid is supplied into the hydraulic pressure chamber 95 to slidably move the slide pin 86 to the other end side against the return spring 89, then the escape hole 93 is placed into the coaxial relationship with the stem hole 87b and is in communication with the stem hole 87b. The diameter of the escape hole 93 is formed greater than the diameter of the valve stem end 11d.

The valve stem end 11d of the intake valve 11 is provided in a state in which it is inserted in the stem hole 87b and engaged with the receiving portion 93a of the slide pin 86. In the valve deactivation mechanism 80, by sliding movement of the slide pin 86, the engaging state between the valve lifter 13 and the intake valve 11 and exhaust valve 12 varies.

In the valve deactivation mechanism 80, in a state wherein the first spool valve 75a is controlled into an OFF state and the hydraulic pressure acting upon the slide pin 86 is low and besides the slide pin 86 is not moved to the other end side against the return sprint 89, the valve stem end 11d contacts with the receiving portion 93a and the intake valve 11 is connected to the lifter 85. Therefore, if the lifter 85 is pressed to move downwardly by the camshaft 25 upon rotation through the intake cam 30, then the pressure force acts upon the intake valve 11 through the receiving portion 93a of the slide pin 86 to open the intake valve 11 and then the valve deactivation mechanism 80 is placed into a cylinder activation state wherein the intake valve 11 opens and closes together with back and forth movement of the lifter 85.

On the other hand, if the valve deactivation mechanism 80 operates and the first spool valve 75a is controlled to an ON state to supply the working fluid into the hydraulic pressure chamber 95, then the slide pin 86 is moved to the other end side against the return spring 89. Consequently, the escape hole 93 of the slide pin 86 is in communication with the stem hole 87b and the valve stem end 11d of the intake valve 11 is placed into a state in which it can be fitted into the escape hole 93. In this state, if the lifter 85 is pressed by the camshaft 25 through the intake cam 30 and moved back and forth by rotation of the camshaft 25, then the lifter 85 merely reciprocates upwardly and downwardly solely in the state in which the valve stem end 11d of the intake valve 11 is fitted therein. Consequently, the pressing force of the intake cam 30 is not transmitted to the intake valve 11. In other words, a cylinder deactivation state is established in which the pressing force of the camshaft 25 does not act upon the intake valve 11 even if the camshaft 25 rotates and the valve closing state is maintained.

The valve deactivation mechanism 80 is provided for all of the intake valves 11 and the exhaust valves 12 in the second cylinder C2, and, upon cylinder deactivation of the second cylinder C2, all of the intake valves 11 and the exhaust valves 12 in the second cylinder C2 are placed in a deactivated state. Also in the third cylinder C3, similarly to the second cylinder C2, the valve deactivation mechanism 80 is provided for all of the intake valves 11 and the exhaust valves 12, and, upon cylinder deactivation of the third cylinder C3, all of the intake valves 11 and the exhaust valves 12 in the third cylinder C3 are placed in a deactivated state. In other words, the rear side bank Br configured from the second cylinder C2 and the third cylinder C3 is deactivation cylinders which can be deactivated. Further, the internal combustion engine 1 can carry out four-cylinder driving wherein all of the four cylinders are operative, two-cylinder driving wherein the second cylinder C2 and the third cylinder C3 are deactivated and three-cylinder driving wherein either one of the second cylinder C2 and the third cylinder C3 is deactivated.

The ECU 76 changes over the first spool valve 75a and the second spool valve 75b of the valve deactivation mechanism 80 in response to an operation situation of the vehicle to control cylinder deactivation of the rear side bank Br, and stops, when a cylinder is to be deactivated, fuel supply to the injector 70 of the cylinder to be deactivated. Therefore, the fuel cost of the internal combustion engine 1 can be improved.

On the other hand, the first cylinder C1 and the fourth cylinder C4 do not have the valve deactivation mechanism 80, and the front side bank Bf has normally activated cylinders in which opening and closing of the intake valves 11 and the exhaust valves 12 are carried out normally during operation of the internal combustion engine 1.

In addition, the internal combustion engine 1 includes a valve operation decision section 96 for deciding an activation state of the valve deactivation mechanisms 80 in order to confirm whether or not the valve deactivation mechanisms 80 which are driven by hydraulic pressure are operating regularly in accordance with an instruction of the ECU 76.

The valve operation decision section 96 is configured to include a second intake pressure sensor 97-2 for detecting the pressure of intake air to be supplied into the second cylinder C2, a third intake pressure sensor 97-3 for detecting the pressure of intake air to be supplied into the third cylinder C3, and the ECU 76.

Meanwhile, a first intake pressure sensor 97-1 for detecting the pressure of intake air to be supplied into the first cylinder C1 and the fourth cylinder C4 is provided for the front side bank Bf.

The first intake pressure sensor 97-1 is provided on the front side throttle body 60f and is disposed on the downstream side of the throttle valves 63-1 and 63-4. More particularly, the single first intake pressure sensor 97-1 is provided commonly for the front side throttle body 60f, and the intake pressure on the downstream of the throttle valves 63-1 and 63-4 in the intake paths 61-1 and 61-4 is measured by the single first intake pressure sensor 97-1. In other words, in regard to the front side bank Bf, a detection value of the intake pressure of the first cylinder C1 and the fourth cylinder C4 detected by the single first intake pressure sensor 97-1 is outputted to the ECU 76 as the intake pressure of the front side bank Bf.

The second intake pressure sensor 97-2 is provided on the rear side throttle body 60r and disposed on the downstream side of the throttle valve 63-2. More particularly, the single second intake pressure sensor 97-2 is provided for the intake path 61-2 of the second cylinder C2 and measures the intake air pressure on the downstream of the throttle valve 63-2 in the intake path 61-2 of the second cylinder C2.

The third intake pressure sensor 97-3 is provided on the rear side throttle body 60r and disposed on the downstream side of the throttle valve 63-3. More particularly, the single third intake pressure sensor 97-3 is provided for the intake path 61-3 of the third cylinder C3 and measures the intake air pressure on the downstream of the throttle valve 63-3 in the intake path 61-3 of the third cylinder C3.

In short, in regard to the rear side bank Br, the intake pressures of the second cylinder C2 and the third cylinder C3 are detected by the second intake pressure sensor 97-2 and the third intake pressure sensor 97-3 provided individually for the different cylinders, respectively, and outputted to the ECU 76.

The intake pressures detected by the first intake pressure sensor 97-1, second intake pressure sensor 97-2 and third intake pressure sensor 97-3 are processed by the ECU 76. The ECU 76 determines fuel injection amounts of the injectors 70-1 to 70-4 based on an operation situation such as the detected intake pressures and accelerator openings.

Further, the ECU 76 specifies the operation conditions of the valve deactivation mechanisms 80 of the second cylinder C2 and the third cylinder C3 based on the intake pressures detected by the second intake pressure sensor 97-2 and the third intake pressure sensor 97-3.

In particular, describing taking the second intake pressure sensor 97-2 as an example, when the valve deactivation mechanism 80 is in an OFF state and the second cylinder C2 is not in a deactivated state, since intake air continuously flows to the intake path 61-2 of the second cylinder C2, the intake pressure in the intake path 61-2 of the second cylinder C2 becomes a negative pressure lower than the atmospheric pressure. On the other hand, in the case where the valve deactivation mechanism 80 is in an ON state and the second cylinder C2 is in a deactivated state, since the intake valve 11 is closed and intake air does not continuously flow to the intake path 61-2 of the second cylinder C2, the intake pressure of the intake path 61-2 of the second cylinder C2 is proximate to the atmospheric pressure.

In the present embodiment, in the case where the detection value of the second intake pressure sensor 97-2 is a negative pressure lower than a predetermined intake pressure, the ECU 76 decides that the valve deactivation mechanism 80 is in an inoperative state, but in the case where the detection value of the second intake pressure sensor 97-2 is equal to or higher than the predetermined intake pressure, the ECU 76 decides that the valve deactivation mechanism 80 is in an operative state. The predetermined intake pressure is determined by making a relationship between the intake pressure of the intake path 66 and the actual operative state of the valve deactivation mechanism 80 clear through an experiment or the like so that the relationship between them is placed in an associated state. The predetermined intake pressure may be variable in response to an operation situation.

Also the third cylinder C3 is configured similarly to the second cylinder C2. When the detection value of the third intake pressure sensor 97-3 has a negative pressure lower than the predetermined intake pressure, the ECU 76 decides that the valve deactivation mechanism 80 is in an inoperative state, but when the value of the third intake pressure sensor 97-3 is equal to or higher than the predetermined pressure, the ECU 76 decides that the valve deactivation mechanism 80 of the third cylinder C3 is in an operative state.

Since the operation state of the valve deactivation mechanisms 80 is decided making use of the second intake pressure sensor 97-2 and the third intake pressure sensor 97-3 used for determination of the fuel injection amount for the injectors 70-2 and 70-3 in this manner, the operational state of the valve deactivation mechanisms 80 can be detected and the operational state of the intake valves 11 and the exhaust valves 12 can be grasped with certainty without providing a mechanism for exclusive use.

Further, since the intake pressures of the second cylinder C2 and the third cylinder C3 are detected and the operation states of the valve deactivation mechanisms 80 are decided directly based on a variation of the intake pressures which occurs as a result of actual operation of the valve deactivation mechanisms 80, the operational state can be decided accurately. For example, although it is a possible idea to detect the operational state of a valve deactivation mechanism 80 by detecting the hydraulic pressure of the valve deactivation mechanism 80, in this instance, the structure is complicated and the operation state of the valve deactivation mechanism 80 is decided but indirectly.

Further, since the second intake pressure sensor 97-2 is provided for the second cylinder C2 and the third intake pressure sensor 97-3 is provided for the third cylinder C3 and consequently intake pressure sensors independent of each other are provided individually for those cylinders which can be deactivated, also in the case where three-cylinder operation is carried out, the operational state of the valve deactivation mechanism 80 can be grasped with certainty using the second intake pressure sensor 97-2 or the third intake pressure sensor 97-3.

Figure 5:
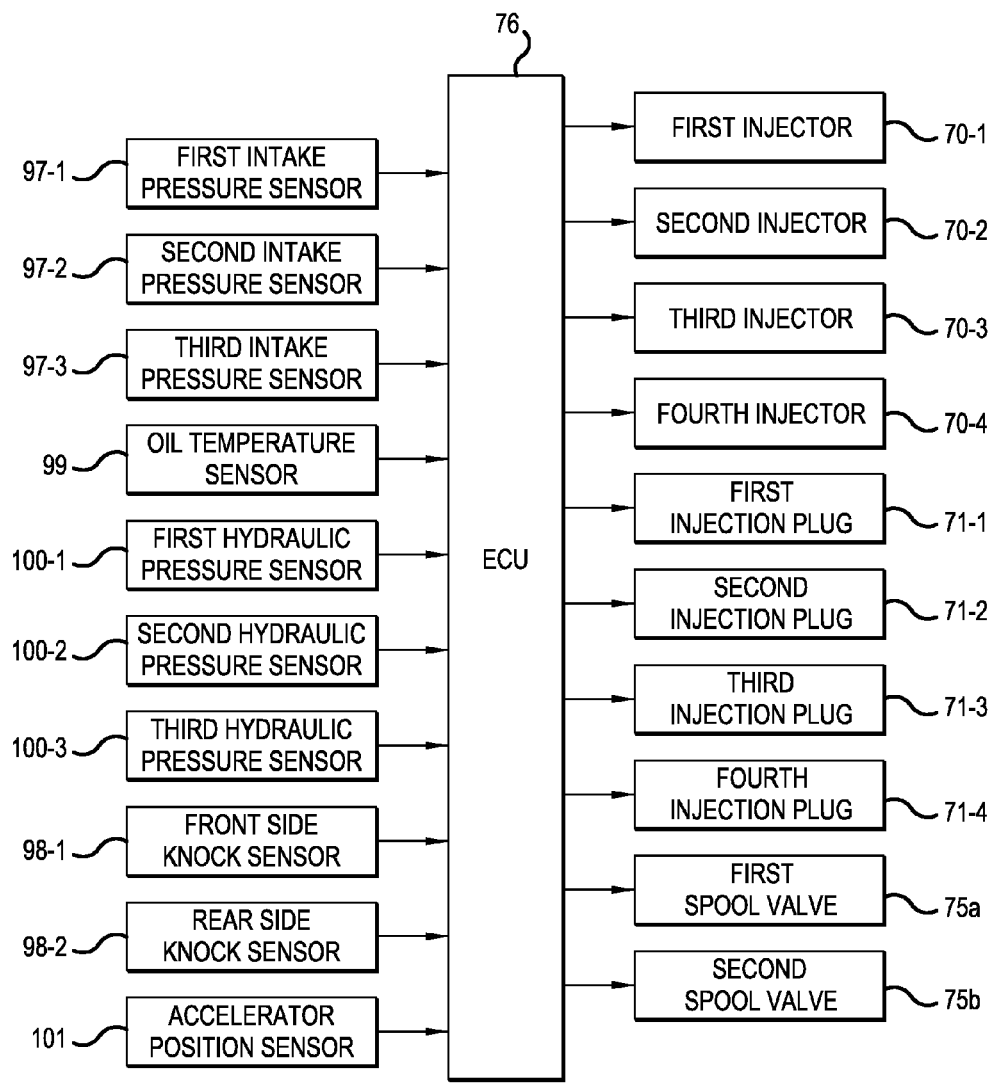
FIG. 5 is a schematic block diagram of a configuration of a control system.

FIG. 5 is a schematic block diagram of the control system.

To the input side of the ECU 76, the first intake pressure sensor 97-1, the second intake pressure sensor 97-2, the third intake pressure sensor 97-3, a front side knock sensor 98-1, a rear side knock sensor 98-2, an oil temperature sensor 99, a first hydraulic pressure sensor 100-1, a second hydraulic pressure sensor 100-2, a third hydraulic pressure sensor 100-3 and an accelerator position sensor 101 which outputs a signal in response to an accelerator opening (grip opening).

To the output side of the ECU 76, the first injector 70-1, second injector 70-2, third injector 70-3, fourth injector 70-4, first ignition plug 71-1, second ignition plug 71-2, third ignition plug 71-3, fourth ignition plug 71-4, first spool valve 75a, and second spool valve 75b are connected.

Actually the first ignition plug 71-1, second ignition plug 71-2, third ignition plug 71-3 and fourth ignition plug 71-4 are not directly connected to the ECU 76 but are connected to the ECU 76 through respective ignition coil driving sections and ignition coils not shown. The ECU 76 outputs driving control signals including an ignition stopping flag signal hereinafter described to the ignition coil driving sections to carry out ignition control.

Now, the operation in principle in the case where transition from cylinder deactivation to cylinder activation is carried out in the embodiment is described.

Figure 6:
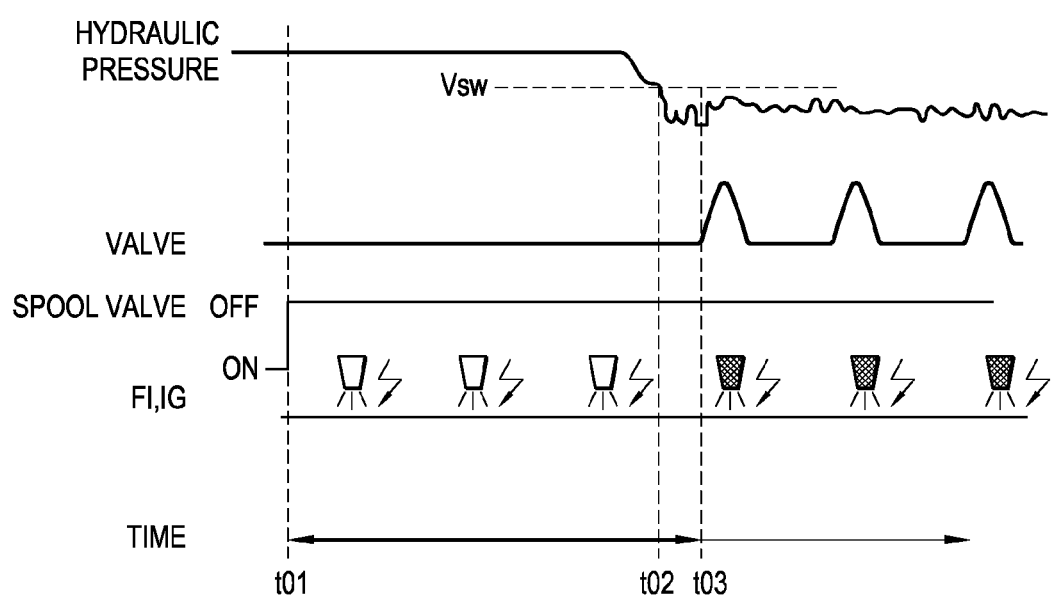
FIG. 6 is an explanatory view of operation in principle upon cylinder deactivation.

FIG. 6 is an explanatory view of operation in principle upon cylinder deactivation.

Referring to FIG. 6, it is assumed that, in an initial state, the second cylinder C2 is in a cylinder deactivation state, and till a point of time immediately preceding to time t01, the first spool valve 75a remains in an ON state. Also it is assumed that, together with the cylinder deactivation state of the second cylinder C2, also fuel injection and ignition by an ignition plug are in a deactivated state also after time to. It is to be noted that, while, in FIG. 6, a fuel injection timing and an ignition timing of an ignition plug upon cylinder activation are illustrated within a period from time t01 to time t02, fuel injection and ignition of an ignition plug are in a deactivated state.

In the cylinder deactivation state of the second cylinder C2, the valve deactivation mechanism 80 operates as described hereinabove. Consequently, even if the lifter 85 is pressed through the intake cam 30 by rotation of the camshaft 25 to make back and forth movement, the lifter 85 merely moves upwardly and downwardly solely in a state in which the valve stem end 11d of the intake valve 11 is fitted therein, but the pressing force of the intake cam 30 is not transmitted to the intake valve 11. Therefore, even if the camshaft 25 rotates, the pressing force of the camshaft 25 does not act upon the intake valve 11, and the intake valve 11 maintains its closed valve state. Similarly, also the valve deactivation mechanism 80 corresponding to the exhaust valve 12 operates to maintain the closed valve state of the exhaust valve 12.

In this state, the first spool valve 75a is placed into an OFF state at time t01. However, the hydraulic pressure detected by the second hydraulic pressure sensor 100-2 remains higher than a changeover hydraulic pressure Vsw, with which changeover from the cylinder deactivation state to the cylinder activation state occurs as seen in FIG. 6 until time t02 comes. Consequently, the cylinder deactivation state in which the intake valve 11 and the exhaust valve 12 of the second cylinder C2 are maintained in the closed state remains maintained till time t02.

Then, after time t02 passes and the hydraulic pressure detected by the second hydraulic pressure sensor 100-2 becomes lower than the changeover hydraulic pressure Vsw with which changeover from the cylinder deactivation state to the cylinder activation state can be carried out, the slide pin 86 is placed into a state in which it is not moved to the other end side against the return spring 89, and the valve stem end 11d of the intake valve 11 which configures the second cylinder C2 is brought into contact with the receiving portion 93a so that the intake valve 11 is connected to the lifter 85. Similarly, also the exhaust valve 12 is connected to the lifter 85 of the corresponding valve deactivation mechanism 80.

Therefore, if the lifter 85 is pressed to move downwardly through the intake cam 30 by rotation of the camshaft 25, then a pressing force acts upon the intake valve 11 through the receiving portion 93a of the slide pin 86 to place the intake valve 11 and the exhaust valve 12 into a state in which they can be opened and closed.

Accordingly, a cylinder activated state is entered in which, when a driving timing of the intake valve 11 comes, the intake valve 11 can operate to open and close in response to back and forth movement of the lifter 85, but when a driving timing of the exhaust valve 12 comes, the exhaust valve 12 can operate to open and close in response to back and forth movement of the lifter 85.

Accordingly, at time t03, the intake valve 11 begins to be activated to start an intake stroke, and at time t04, fuel is injected into the intake path 61-2 by the second injector 70-2.

Then, when the intake stroke and a compression stroke are completed and a predetermined ignition timing comes at time t05, the fuel air mixture is ignited by the second ignition plug 71-2 of the second cylinder C2 and an expansion stroke is entered so that the internal combustion engine 1 is driven.

Now, actual cylinder deactivation/activation control upon traveling of the vehicle is described.

FIG. 7 is a processing flow chart of cylinder deactivation/activation control.

First, the ECU 76 decides in response to the accelerator opening (grip opening) based on an output signal of the accelerator position sensor 101 and an engine speed NE (or vehicle speed, this similarly applies also to the following description)

whether or not deactivation or activation of the second cylinder C2 or the third cylinder C3 should be carried out (step S10).

Then, the ECU 76 decides whether or not a cylinder (second cylinder C2 or third cylinder C3) to be placed into a cylinder deactivation state exists (step S11).

If it is decided at step S11 that a cylinder to be placed into a cylinder deactivation state exists (step S11; Yes), then the ECU 76 calculates the timing (which corresponds to a stage hereinafter described) at which fuel injection by the second injector 70-2 or the third injector 70-3 is to be stopped based on the engine speed NE and an oil temperature detected by the oil temperature sensor 99, and places a flag for stopping fuel injection into an on state at a corresponding timing (step S12). It is to be noted that, in the present embodiment, since an air cycle in which injection and ignition of fuel are not carried out is provided preceding to transition to cylinder deactivation, the timing at which the flag for stopping fuel injection is to be placed into an on state is not only the actual fuel injection timing described above, but may be any time in an intake stroke of a four-cycle period immediately prior to the period corresponding to this air cycle after fuel is injected but before an intake stroke in the period corresponding to the air cycle.

In this instance, the ECU 76 has stored in a memory thereof not shown in advance a control map for calculating a time lag (response delay time) after a driving instruction signal is outputted to the first spool valve 75a or the second spool valve 75b as an oil control valve until the valve deactivation mechanism 80 is actually activated to place and keep the intake valve 11 and the exhaust valve 12 of the second cylinder C2 or the third cylinder C3 into and in a deactivated state (closed state) using the engine speed NE and the oil temperature detected by the oil temperature sensor 99 as parameters in advance.

Accordingly, the ECU 76 can acquire a timing (which corresponds to a stage hereinafter described) at which fuel injection by the second injector 70-2 or the third injector 70-3 can be stopped earliest when the fuel injection timing is delayed while the output power variation caused by change of the cylinder number in the case where the second cylinder C2 or the third cylinder C3 is placed into a deactivated state is suppressed based on the engine speed NE and the oil temperature detected by the oil temperature sensor 99.

If only the engine speed NE is taken into consideration, then if the engine speed NE is high, then the fuel injection frequency is high and the time lag necessary to stop fuel injection is small, but if the engine speed NE is low, then the fuel injection frequency is low and the time lag necessary to stop fuel injection is great.

If only the oil temperature detected by the oil temperature sensor 99 is taken into consideration, then if the oil temperature is high, then the viscosity is low, and the time lag until the intake valve 11 and the exhaust valve 12 are placed into and kept in a deactivated state (closed state) is small, but if the oil temperature is low, the viscosity is high, and the time lag until the intake valve 11 and the exhaust valve 12 are placed into and kept in a deactivated state (closed state) is great.

In addition, since it is considered that actually the time lag until the intake valve 11 and the exhaust valve 12 are placed into and kept in a deactivated state (closed state) is always greater than the time lag necessary to stop fuel injection, if both of the engine speed NE and the oil temperature detected by the oil temperature sensor 99 are taken into consideration, then a timing at which fuel injection can be stopped earliest after the time lag after the intake valve 11 and the exhaust valve 12 are placed into and kept in a deactivated state (closed state) by delaying the fuel injection timing is acquired from the control map.

Thereafter, the ECU 76 starts counting of an ignition stopping waiting counter for detecting the timing (stage) at which ignition is to be stopped in response to the engine speed NE and the oil temperature detected by the oil temperature sensor 99. Then, the ECU 76 places the ignition stopping flag signal into an on state at a timing (stage) corresponding to the count value of the ignition stopping waiting counter and outputs the ignition stopping flag signal to the ignition coil driving section not shown (step S13). As a result, the ignition coil driving section halts driving the ignition coil to halt ignition of the ignition plug.

Further, the ECU 76 starts counting of a cylinder deactivation waiting counter for detecting a timing (stage) at which cylinder deactivation is to be executed from a timing (which corresponds to a stage hereinafter described) at which fuel injection by the second injector 70-2 or the third injector 70-3 is to be stopped based on the engine speed NE and the oil temperature detected by the oil temperature sensor 99. Then, the ECU 76 outputs a cylinder deactivation signal to activate the valve deactivation mechanism 80 in order to execute cylinder deactivation at the timing (stage) at which cylinder deactivation is to be executed (step S14).

On the other hand, if a cylinder to be placed into a cylinder deactivation state exists as a result of the decision at step S11 (step S11; No), then the ECU 76 calculates a timing (stage) at which execution of cylinder activation is to be started based on the engine speed NE and the oil temperature detected by the oil temperature sensor 99. Then, the ECU 76 outputs a cylinder activation signal at the timing to stop the activation of the valve deactivation mechanism 80 (step S15).

In particular, the ECU 76 has stored in the memory thereof not shown in advance a control map for calculating a time lag (response delay time) after a driving instruction signal is outputted to the first spool valve 75a or the second spool valve 75b as an oil control valve until the valve deactivation mechanism 80 is actually activated to place and keep the intake valve 11 and the exhaust valve 12 of the second cylinder C2 or the third cylinder C3 into and in an activated state (state in which the intake valve 11 and the exhaust valve 12 can be moved upwardly and downwardly by the camshaft 25) using the engine speed NE and the oil temperature detected by the oil temperature sensor 99 as parameters in advance.

Accordingly, the ECU 76 can acquire a timing (which corresponds to a stage hereinafter described) at which fuel injection by the second injector 70-2 or the third injector 70-3 can be re-started the earliest when the fuel injection timing is delayed while the output power variation caused by change of the cylinder number in the case where the second cylinder C2 or the third cylinder C3 is placed into an activated state is suppressed based on the engine speed NE and the oil temperature detected by the oil temperature sensor 99.

If only the engine speed NE is taken into consideration, then if the engine speed NE is high, then the fuel injection frequency is high and the time lag necessary to re-start fuel injection is small, but if the engine speed NE is low, then the fuel injection frequency is low and the time lag necessary to re-start fuel injection is great.

On the other hand, if only the oil temperature detected by the oil temperature sensor 99 is taken into consideration, then if the oil temperature is high, then the viscosity is low, and the time lag until the intake valve 11 and the exhaust valve 12 are placed into an activated state is small, but if the oil temperature is low, the viscosity is high, and the time lag until the intake valve 11 and the exhaust valve 12 are placed into an activated state is great.

In addition, since it is considered that actually the time lag until the intake valve 11 and the exhaust valve 12 are placed into an activated state is always greater than the time lag necessary to stop fuel injection, if both of the engine speed NE and the oil temperature detected by the oil temperature sensor 99 are taken into consideration, then a timing at which fuel injection can be re-started earliest after the time lag until the intake valve 11 and the exhaust valve 12 are placed into an activated state by delaying the fuel injection timing elapses is acquired from the control map.

Thereafter, the ECU 76 starts counting of an ignition starting waiting counter for detecting the timing (stage) at which ignition by the second ignition plug 71-2 or the third ignition plug 71-3 is to be started by delaying the ignition timing from the timing (stage) at which execution of cylinder deactivation acquired from the control map is to be started based on the engine speed NE and the oil temperature detected by the oil temperature sensor 99. Then, the ECU 76 places the ignition stopping flag signal into an off state at a timing (stage) corresponding to the count value of the ignition starting waiting counter and outputs the ignition starting flag signal to the ignition coil driving section not shown (step S16). As a result, subsequently, the ignition coil driving section re-starts driving the ignition coil to carry out ignition of the ignition plug. This timing at which the ignition stopping flag signal is to be placed into an off state, that is, the timing at which permission of ignition of the ignition plug is to be started, may be any timing within a period after the ignition timing corresponding to an expansion stroke immediately preceding to transition into cylinder activation until an ignition timing in an expansion stroke after the cylinder activation comes.

Further, the ECU 76 starts counting of an injection starting waiting counter for detecting a timing (stage) at which fuel injection by the second injector 70-2 or the third injector 70-3 is to be re-started from the timing (stage) at which execution of cylinder activation is to be started based on the engine speed NE and the oil temperature detected by the oil temperature sensor 99. Then, the ECU 76 places the flag for stopping fuel injection into an off state at the corresponding timing (step S17).

It is to be noted that, in parallel to the processes at steps S10 to S17 described above, an interrupt process is carried out at every predetermined timing (for example, after every 2 ms) for the three systems of the throttle valves 63-1 to 63-4 including the throttle valves 63-1 and 63-4 (first system) of the TBW type corresponding to the first cylinder C1 and the fourth cylinder C4, respectively, the throttle valve 63-2 (second system) of the TBW type corresponding to the second cylinder C2 and the throttle valve 63-3 (third system) of the TBW type corresponding to the third cylinder C3. In the interrupt process, a target throttle valve opening calculation step of calculating an optimum target throttle valve opening for each system and a throttle valve opening controlling step of controlling the throttle valves 63-1 to 63-4 of the three systems for each system such that a throttle valve opening for each system will be the throttle valve opening which is calculated in the target throttle valve opening calculation step are executed.

In the following, more particular cylinder deactivation/activation control is described.

Figure 8A:
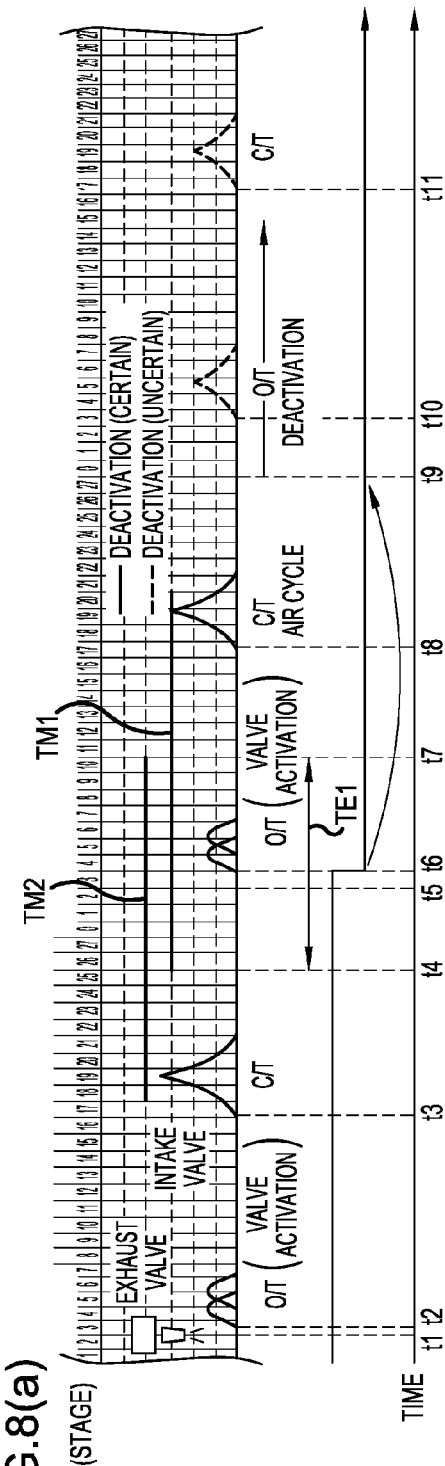
FIGS. 8(a) and 8(b) are processing timing charts of more particular cylinder deactivation/activation control.
Figure 8B:
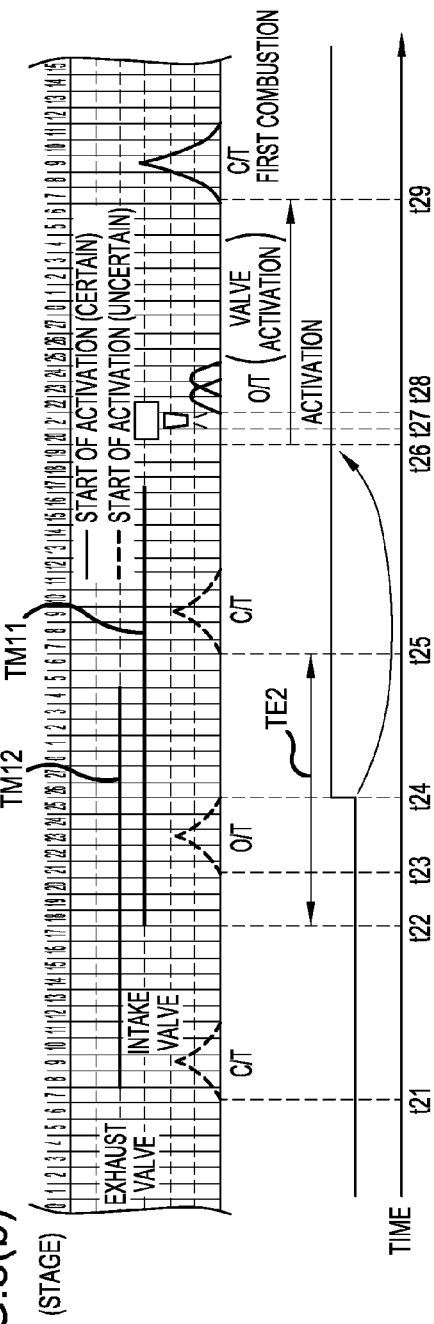

FIGS. 8(a) and 8(b) are processing timing charts of more particular cylinder deactivation/activation control.

In FIGS. 8(a) and 8(b) it is assumed that the four successive strokes (intake stroke, compression stroke, expansion stroke and exhaust stroke) of the internal combustion engine 1 as a four-cycle engine are configured from 28 stages (each stroke includes 7 stages) and timing control is carried out in a unit of a stage for the convenience of description.

First, operation upon transition from a cylinder deactivation state to a cylinder activation state is described with reference to FIG. 8(a).

It is to be noted that the following description is given taking a case in which cylinder deactivation of the second cylinder C2 which is in a cylinder activation state in an initial state is to be carried out as an example.

In an intake stroke of the second cylinder C2, fuel is injected from the second injector 70-2 at time t1, and then, after a compression stroke and an expansion stroke in which ignition by the second ignition plug 71-2 is carried out are carried out, the exhaust valve 12 is opened to carry out an exhaust stroke at time t2.

Then at time t3, the intake valve 11 is opened to enter another intake stroke.

In the case where the first spool valve 75a is driven, in order to place both of the intake valve 11 and the exhaust valve 12 of the second cylinder C2 into a closed state with certainty by means of the valve deactivation mechanism 80 to place the second cylinder C2 into a cylinder deactivation state, it is necessary to issue an instruction within a period TM1 within which the intake valve 11 of the second cylinder C2 can be placed into a closed state with certainty and a period TM2 within which the exhaust valve 12 of the second cylinder C2 can be placed into a closed state with certainty taking the time lag of the hydraulic system for activating the valve deactivation mechanism 80 into consideration.

In order to reduce a torque shock caused by change of the cylinder number, it is necessary to place fuel injection and ignition of the ignition plug into a disabled state before the intake valve 11 and the exhaust valve 12 start transition into a deactivated state.

More particularly, it is necessary to issue a deactivation instruction within a period (period indicated by the thick solid line TM1 at an upper portion in FIG. 8(a)) within which it is possible to deactivate the intake valve 11 with certainty but refrain from issuing a deactivation instruction within another period (period other than the period indicated by the thick sold line TM1 in FIG. 8(a)) within which the intake valve 11 cannot be deactivated with certainty. Here, the period within which the intake valve 11 can be deactivated with certainty is a period within which the intake valve 11 can be deactivated for cylinder deactivation except a period within which fuel to be combusted remains in the combustion chamber (period after fuel injection but before ignition) or a period within which exhaust gas after combustion remains in the combustion chamber (period after ignition but before exhaust).

Similarly, it is necessary to issue a deactivation instruction within a period (period indicated by the thick solid line TM2 in FIG. 8(a)) within which it is possible to deactivate the exhaust valve 12 with certainty but refrain from issuing a deactivation instruction within another period (period other than the period indicated by the thick sold line TM2 in FIG. 8(a)) within which the exhaust valve 12 cannot be deactivated with certainty. The period within which the exhaust valve 12 can be deactivated with certainty is a period within which the exhaust valve 12 can be deactivated for cylinder deactivation except a period within which fuel to be combusted remains in the combustion chamber (period after fuel injection but before ignition) or a period within which exhaust gas after combustion remains in the combustion chamber (period after ignition but before exhaust).

Accordingly, actually it is necessary for the ECU 76 to issue a cylinder deactivation instruction within a period TE1 corresponding to the period from time t4 to time t7 which is a period common to the period indicated by the thick solid line TM1 and the period indicated by the thick solid line TM2.

The timing at which a cylinder deactivation instruction is to be issued actually within the period TE1 is determined using the oil temperature corresponding to an output of the oil temperature sensor 99 and the engine speed NE as control parameters in the ECU 76 as described hereinabove and referring to the control map stored in advance from the control parameters.

Further, hydraulic pressures detected by the first to third hydraulic pressure sensors 100-1 to 100-3 (particularly a hydraulic pressure detected by the first hydraulic pressure sensor 100-1) may be used as control parameters to refer to the control map to determine a timing at which a cylinder deactivation instruction is to be issued actually. Further, in order to enhance the accuracy, also it is possible to take the crank rotational angle, the camshaft rotational angle and the angular velocities of them into consideration to determine a timing at which a cylinder deactivation instruction is to be issued actually.

Further, also it is necessary to stop fuel injection prior to this. The timing at which the stopping of fuel injection is to be started may be any time before an intake stroke prior at least by one period to a period of four cycles within which transition to cylinder deactivation is to be carried out actually but after a fuel injection timing at which fuel combusted last is injected. This is because it is intended to provide, in an intake stroke prior by at least one period to a period of four cycles within which transition to cylinder deactivation is to be carried out actually, an air cycle hereinafter described for taking in only air which does not include fuel and thereby to prevent fuel from being consumed wastefully during cylinder deactivation.

To this end, the ECU 76 determines the timing at which a fuel injection stopping instruction is to be actually issued within the period TE1 similarly using the oil temperature corresponding to an output of the oil temperature sensor 99 and the engine speed NE as control parameters in the ECU 76 and referring to the control map stored in advance therein from the control parameters as described hereinabove.

Further, hydraulic pressures detected by the first to third hydraulic pressure sensors 100-1 to 100-3 (particularly a hydraulic pressure detected by the first hydraulic pressure sensor 100-1) may be used as control parameters to refer to the control map to determine a timing at which a cylinder deactivation instruction is to be issued actually. Further, in order to enhance the accuracy, also it is possible to take the crank rotational angle, the camshaft rotational angle and the angular velocities of them into consideration to determine a timing at which a cylinder deactivation instruction is to be issued actually.

A more particular configuration of the control map is described taking a case in which the oil temperature is used as a control parameter as an example.

Figure 10A:
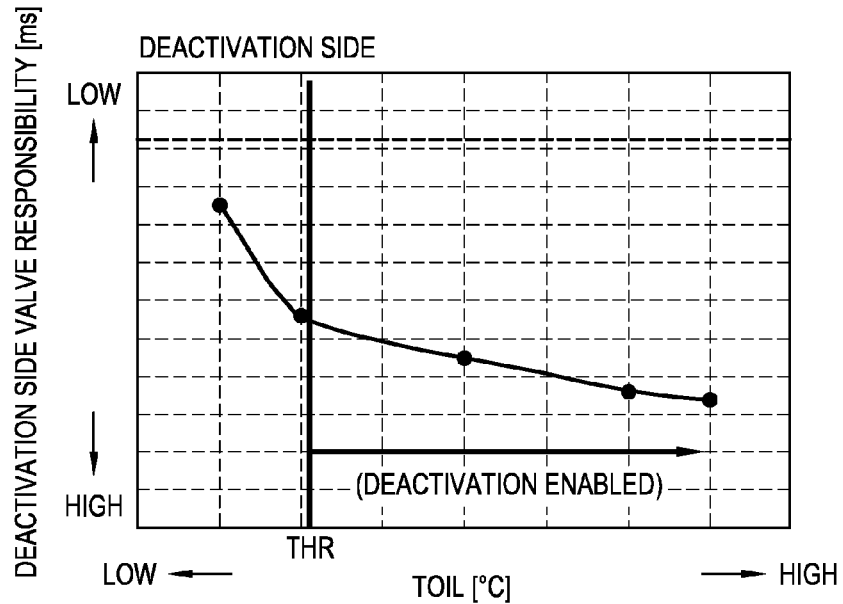
FIGS. 10(a) and 10(b) are explanatory views of the responsibility of a spool valve in the case where the oil temperature is used as a control parameter.
Figure 10B:
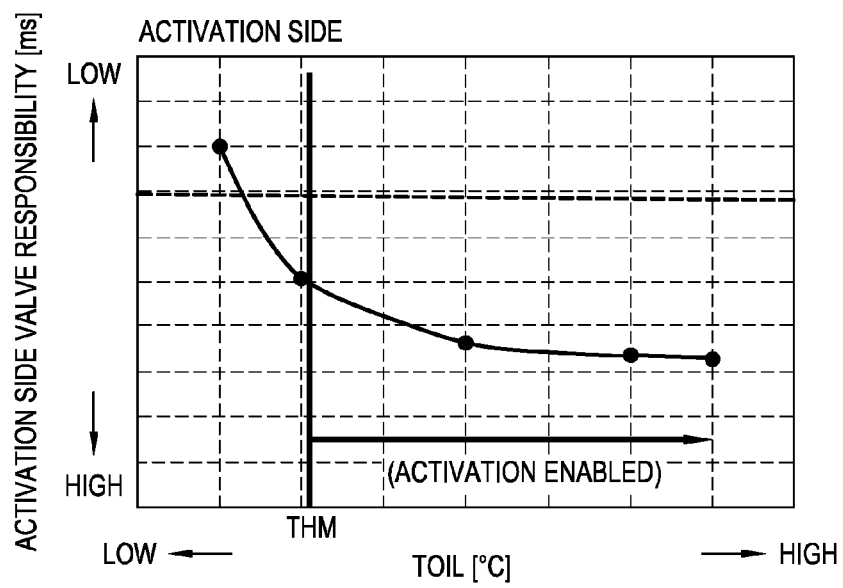

FIGS. 10(a) and 10(b) are explanatory views of the responsibility of a spool valve in the case where the oil temperature is used as a control parameter.

FIG. 10(a) is an explanatory view of the responsibility of a spool valve corresponding to a control map in the case where cylinder deactivation is carried out. This control map for cylinder deactivation which corresponds to a relationship between the oil temperature Toil (axis of abscissa) and the response delay time (axis of ordinate) corresponding to the responsibility is stored in advance in the ECU 76.

FIG. 10(b) is an explanatory view of the responsibility of a valve (intake valve 11 and exhaust valve 12) corresponding to a control map in the case where cylinder activation is carried out. This control map for cylinder activation corresponding to a relationship between the oil temperature Toil (axis of abscissa) and the response delay time (axis of ordinate) corresponding to the responsibility is stored in advance in the ECU 76.

Upon cylinder deactivation, a predetermined threshold temperature THR is set as seen in FIG. 10(a), and in the case where the oil temperature Toil (° C.) detected by the oil temperature sensor 99 is lower than the threshold temperature THR, cylinder deactivation is not carried out. This is because, since, in the case where the oil temperature is lower than the threshold temperature THR, the responsibility for placing the intake valve 11 and the exhaust valve 12 into a deactivated state drops suddenly, it is intended to prevent occurrence of a shock upon output power variation upon the changeover due to failure in smooth transition into cylinder deactivation within a predetermined cylinder deactivation target time.

In the case where the oil temperature Toil at present is equal to or higher than the threshold temperature THR, the responsibility for placing the intake valve 11 and the exhaust valve 12 into a deactivated state is sufficient and cylinder deactivation can be entered smoothly within predetermined cylinder deactivation target time. Therefore, a timing (stage) of timing transition which corresponds to the response delay time corresponding to the oil temperature Toil at present and is earliest to deactivate ignition and deactivate fuel injection is specified from within the control map to enter cylinder deactivation.

Similarly, upon cylinder activation, another threshold temperature THM is set in advance as seen in FIG. 10(b), and in the case where the oil temperature Toil (° C.) detected by the oil temperature sensor 99 is lower than the threshold temperature THM, cylinder activation is not carried out. This is because, since, in the case where the oil temperature is lower than the threshold temperature THM, the responsibility for placing the intake valve 11 and the exhaust valve 12 into an activated state drops suddenly, it is intended to prevent the occurrence of a shock upon output power variation upon a changeover caused by failure to smoothly enter cylinder activation within predetermined cylinder activation target time.

In the case where the oil temperature Toil at present is equal to or higher than the threshold temperature THM, the responsibility for placing the intake valve 11 and the exhaust valve 12 into an activated state is sufficient and cylinder activation can be entered smoothly within predetermined cylinder deactivation target time. Therefore, a timing (stage) of timing transition which corresponds to the response delay time corresponding to the oil temperature Toil at present and is earliest to re-start ignition and activate fuel injection is specified from within the control map to enter cylinder activation.

If the timing (stage) at which cylinder deactivation is to be entered is specified from the control map, then, for example, at time t5, the ECU 76 carries out stopping decision of fuel injection at step S12 of FIG. 7 so that fuel is not injected from the second injector 70-2 at the timing at which fuel is to be injected from the second injector 70-2, that is, at the third stage specified from the control map from among the 28 stages described hereinabove and then carries out setting so that the injection stopping flag is placed into an on state at the third stage. The state in which the injection stopping flag is on continues to continuously stop fuel injection until cylinder deactivation is canceled to start cylinder activation.

As a result, fuel injection by the second injector 70-2 is inhibited at the third stage corresponding to time t5. Thereafter, at time t6, the ECU 76 outputs a deactivation instruction so that the second cylinder C2 can enter a deactivated state at time t9 taking the time lag of the hydraulic system for activating the valve deactivation mechanism 80 into consideration.

In parallel to this, at time t6, an exhaust stroke is entered and the exhaust valve 12 is opened to carry out exhaust, and at time t8, an intake stroke is entered and the intake valve 11 is opened to carry out intake as gas exchange (air cycle). As a result, the inside of the cylinder is placed into a state in which introduced air is taken therein, and when transition from cylinder deactivation into a cylinder activation state occurs, smoldering by lubricating oil sticking to the ignition plug (in the second cylinder C2, the second ignition plug 71-2) can be suppressed.

Then at time t9, the ECU 76 starts counting of the cylinder deactivation waiting counter for detecting the 0th stage corresponding to time t9 at which cylinder deactivation is to be executed from a timing (which corresponds to a stage hereinafter described) at which fuel injection by the second injector 70-2 at time t5 is stopped in the intake stroke. Then, when the counting of the cylinder deactivation waiting counter is completed at time t9, the valve deactivation mechanism 80 is placed in an activated state and the second cylinder C2 is placed into a cylinder deactivation state. In this instance, the count value of the cylinder deactivation waiting counter corresponds to the time lag of the hydraulic system predicted by the ECU 76 for activating the valve deactivation mechanism 80. Thus, after then, it is assured that a cylinder deactivation state is established with certainty.

As a result, after time t10, the exhaust valve 12 and the intake valve 11 maintain their closed state as indicated by broken lines in FIG. 8(a) until the cylinder deactivation is canceled from various conditions.

The operation upon transition from a cylinder deactivation state to a cylinder activation state is described with reference to FIG. 8(b).

It is to be noted that, also in the following description, description is given taking a case in which cylinder activation of the second cylinder C2 which is in a deactivated state in its initial state is carried out as an example.

To the second cylinder C2 which is in a cylinder deactivation state, time t21 is a timing at which the intake valve 11 should originally be placed into an open state to enter an intake stroke. However, since the second cylinder C2 still remains in a cylinder deactivation state at time t21, the intake valve 11 remains in a closed state.

In addition, even if driving of the first spool valve 75a is stopped, in order to stop operation of the valve deactivation mechanism 80 to place the second cylinder C2 into a cylinder activation state, some time period is required because of an influence of the time lag (response delay time) of the hydraulic system.

Further, in order to reduce a torque shock upon change of the cylinder number, it is necessary to prevent fuel injection and ignition of an ignition plug from being carried out before transition of the intake valve 11 and the exhaust valve 12 into an activated state is completed.

Further, when activation of both of the intake valve 11 and the exhaust valve 12 is to be started, it is necessary to start activation of the exhaust valve 12 first. This is because it is intended to prevent the filling efficiency ηv in the first time combustion stroke from being influenced by the amount of air in the combustion chamber within the cylinder stopping period.

In particular, in order to place both of the intake valve 11 and the exhaust valve 12 of the second cylinder C2 into a state in which they can start activation with certainty by the valve deactivation mechanisms 80 individually corresponding to the intake valve 11 and the exhaust valve 12 to place the second cylinder C2 into a cylinder activation state, it is necessary to issue an instruction within a period within which it is possible to start activation of the intake valve 11 of the second cylinder C2 with certainty and a period within which it is possible to start activation of the exhaust valve 12 of the second cylinder C2 with certainty taking the time lag (response delay time) of the hydraulic system for stopping operation of the valve deactivation mechanisms 80.

In particular, it is necessary to issue an activation starting instruction within a period within which activation of the intake valve 11 of the second cylinder C2 can be started with certainty (within a period indicated by a thick solid line TM11 in FIG. 8(b)) but refrain from issuing an activation starting instruction within a period within which activation of the intake valve 11 cannot be started with certainty (within a period other than the period indicated by the thick solid line TM11 in FIG. 8(b)).

More particularly, it is necessary to issue an activation starting instruction within a period within which activation of the intake valve 11 of the second cylinder C2 can be started with certainty (within a period indicated by a thick solid line TM11 in FIG. 8(b)) but refrain from issuing a deactivating instruction within a period within which activation of the intake valve 11 cannot be started with certainty (within periods indicated by thick broken lines forwardly and rearwardly of the period indicated by the thick solid line TM11 in FIG. 8(b)).

The period within which activation of the intake valve 11 can be started with certainty is a period within which, when activation of the exhaust valve 12 is started first (this corresponds to an exhaust stroke), in an intake stroke immediately after the exhaust stroke, the intake valve 11 can be placed into an activation-enabled state with certainty.

Similarly, it is necessary to issue an activation starting instruction within a period within which the exhaust valve 12 can be deactivated with certainty (within a period indicated by a thick solid line TM12 in (b) of FIG. 8) but refrain from issuing an activation starting instruction within a period within which the exhaust valve 12 cannot be deactivated with certainty (within a period indicated by a thick broken line next to the thick solid line TM2 in FIG. 8(a)).

Here, the period within which activation of the exhaust valve 12 can be started with certainty is a period within which the exhaust valve 12 can be activated prior to the intake valve 11 after cylinder activation is started actually taking the time lag of the hydraulic system into consideration.

Accordingly, actually it is necessary for the ECU 76 to issue a cylinder activation starting instruction within a period TE2 corresponding to the period from time t22 to time t25 which is a period common to the period indicated by the thick solid line TM11 and the period indicated by the thick solid line TM12.

The timing at which a cylinder activation starting instruction is to be actually issued within the period TE2 is determined using the oil temperature corresponding to an output of the oil temperature sensor 99 and the engine speed NE as control parameters and referring to the control map stored in advance in the ECU 76 from the control parameters.

Further, hydraulic pressures detected by the first to third hydraulic pressure sensors 100-1 to 100-3 (particularly a hydraulic pressure detected by the first hydraulic pressure sensor 100-1) may be used as control parameters to refer to the control map to determine a timing at which a cylinder deactivation instruction is to be issued actually. Further, in order to enhance the accuracy, also it is possible to take the crank rotational angle, the camshaft rotational angle and the angular velocities of them into consideration to determine a timing at which a cylinder deactivation instruction is to be issued actually.

Further, it is necessary to re-start fuel injection subsequently. To this end, the ECU 76 determines the timing at which an instruction to re-start fuel injection within the period TE2 similarly using the oil temperature corresponding to an output of the oil temperature sensor 99 and the engine speed NE as control parameters and referring to the control map stored in advance in the ECU 76 from the control parameters.

Further, hydraulic pressures detected by the first to third hydraulic pressure sensors 100-1 to 100-3 (particularly a hydraulic pressure detected by the first hydraulic pressure sensor 100-1) may be used as control parameters to refer to the control map to determine a timing at which a cylinder deactivation instruction is to be issued actually. Further, in order to enhance the accuracy, also it is possible to take the crank rotational angle, the camshaft rotational angle and the angular velocities of them into consideration to determine a timing at which a cylinder deactivation instruction is to be issued actually.

In addition, time t23 is a timing at which the exhaust valve 12 should originally be placed into an open state to enter an exhaust stroke. However, since the second cylinder C2 still remains in a cylinder deactivation state at time t23, the exhaust valve 12 remains in a closed state.

At the 26th stage corresponding to time t24, in order to stop activation of the valve deactivation mechanism 80, the ECU 76 outputs an activation starting instruction so that the second cylinder C2 can enter an activated state at time t26, that is, at a timing prior to the first exhaust stroke after starting of activation taking the time lag of the hydraulic system into consideration. As the activation starting instruction, a driving stopping signal for the first spool valve 75a is issued, and when the counting of the cylinder activation starting waiting counter is completed at time t26, the valve deactivation mechanism 80 is placed into an activation stopping state and the second cylinder C2 is placed into a cylinder activation state.

At time t27, an exhaust stroke is entered, and fuel is injected from the second injector 70-2. Thereafter, the exhaust valve 12 is opened to execute an exhaust stroke at time t28.

Then at time t29, the intake valve 11 is opened to enter an intake stroke. Thereafter, the second cylinder C2 is placed into a cylinder activation state and carries out ordinary operation.

Figure 9:
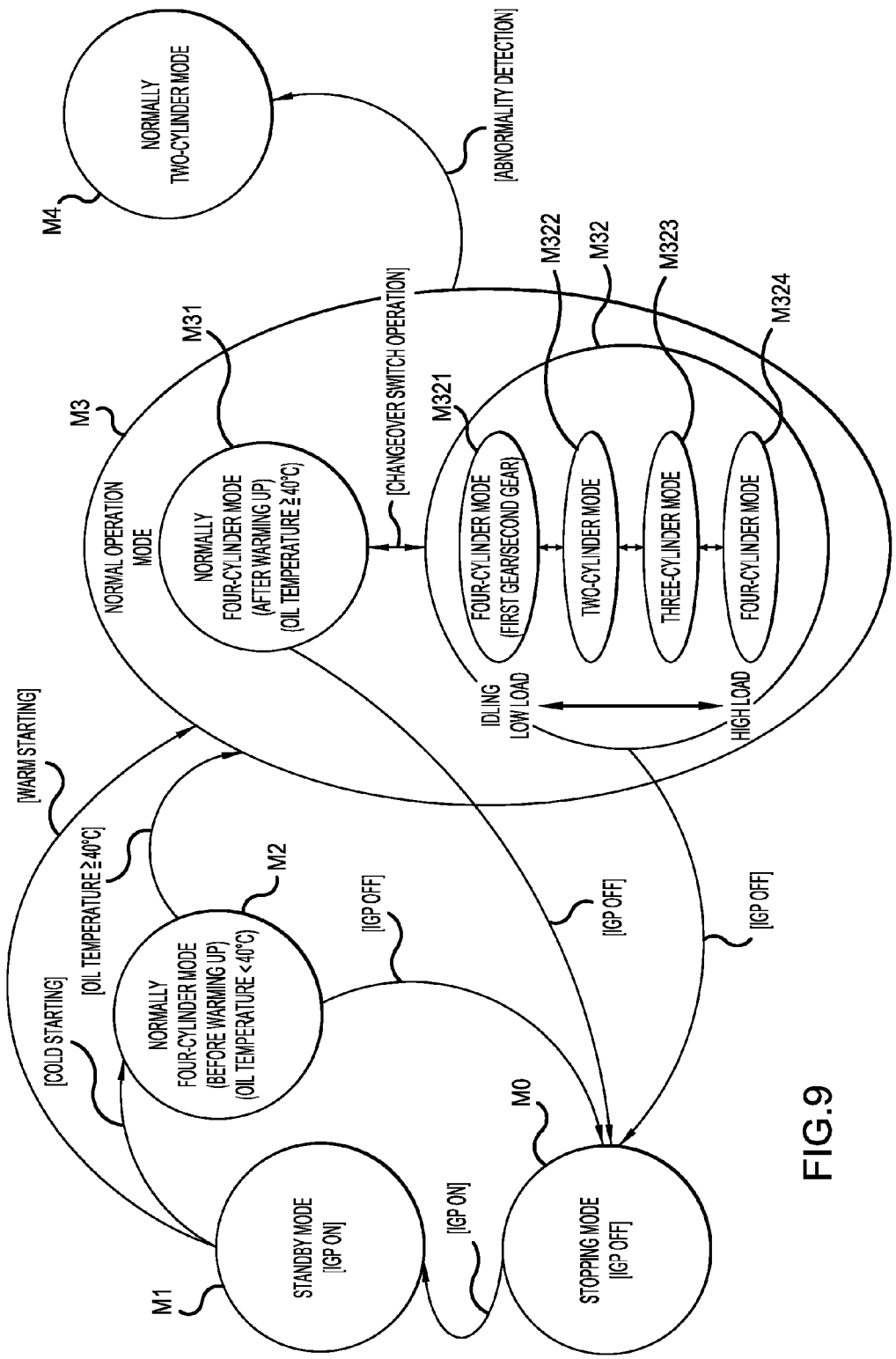
FIG. 9 is a state transition diagram of a cylinder operation mode.

FIG. 9 is a state transition diagram of an internal combustion engine.

The internal combustion engine roughly has five operation modes.

In particular, the internal combustion engine 1 has a stopping mode M0, a standby mode M1, a normally four-cylinder mode M2 before warming up, a normal operation mode M3 and a fail mode M4.

First, in a non-driven state (stopping state) of the internal combustion engine 1, the internal combustion engine 1 is in the stopping mode M0, in which the key position is a switch off position (or handle bar locked position).

At this time, the valve deactivation mechanisms 80 are in an inoperative state, and target openings of all of the throttle valves 63-1 to 63-4 of the three systems of the throttle valves 63-1 and 63-4 (first system), throttle valve 63-2 (second system) and throttle valve 63-3 (third system) are equal to each other.

If, in the stopping mode M0, the main switch is operated and the key position changes to a switch on (=IGP on) position, then the operation mode changes to the standby mode M1. At this time, the valve deactivation mechanisms 80 are placed into an inoperative state, and target openings of all of the throttle valves 63-1 to 63-4 of the three systems of the throttle valves 63-1 and 63-4 (first system), throttle valve 63-2 (second system) and throttle valve 63-3 (third system) are equal to each other.

If, in the standby mode M1, the main switch is operated and the key position comes to an ignition on position, then if cold starting is carried out, then the operation mode changes to the normally four-cylinder mode M2 before warming up. This normally four-cylinder mode M2 before warming up is a mode which is entered when the oil temperature detected by the oil temperature sensor 99 is lower than the predetermined threshold value temperature. At this time, the valve deactivation mechanism 80 is placed into an inoperative state, and target openings of all of the throttle valves 63-1 to 63-4 of the three systems of the throttle valves 63-1 and 63-4 (first system), throttle valve 63-2 (second system) and throttle valve 63-3 (third system) are equal to each other.

If in this normally four-cylinder mode M2, the oil temperature detected by the oil temperature sensor 99 is equal to or higher than the predetermined threshold value oil temperature, then the operation mode changes to the normal operation mode M3.

On the other hand, when, in the internal combustion engine 1, the main switch is operated and the key position comes to the ignition on position, if warm-up starting is carried out, then the operational mode changes to the normal operational mode M3.

The normal operational mode M3 can be roughly divided into a normally four-cylinder mode M31 after warming up and a variable cylinder mode M32 in which the activated cylinder number can be changed automatically. Then, if the user selects one of the modes in advance by means of a predetermined changeover switch, then the mode is selected exclusively.

The normally four-cylinder mode M31 after warming up is a mode in the case where the oil temperature detected by the oil temperature sensor 99 is equal to or higher than the predetermined threshold value oil temperature. At this time, the valve deactivation mechanism 80 is controlled to an inoperative state, and target openings of all of the throttle valves 63-1 to 63-4 of the three systems of the throttle valves 63-1 and 63-4 (first system), throttle valve 63-2 (second system) and throttle valve 63-3 (third system) are equal to each other.

On the other hand, the variable cylinder mode M32 is a mode in which the activated cylinder number is changed in response to the magnitude of the load, the engine speed, the vehicle speed or the like. At this time, the operative state or the inoperative state of the valve deactivation mechanisms 80 is selected, and target openings of the throttle valves 63-1 to 63-4 of the three systems of the throttle valves 63-1 and 63-4 (first system), throttle valve 63-2 (second system) and throttle valve 63-3 (third system) are calculated individually for the systems. Further, in each deactivated cylinder, fuel injection is stopped. Further, the rider is notified by an indicator not shown that the variable cylinder mode M32 is selected.

Further, the variable cylinder mode M32 includes four cylinder modes including a four-cylinder mode (first gear/second gear) M321 in which all of the first cylinder C1 to the fourth cylinder C4 are activated cylinders, a two-cylinder mode M322 in which the first cylinder C1 and the fourth cylinder C4 are activated cylinders, a three-cylinder mode M323 in which the first cylinder C1, the fourth cylinder C4 and one of the second cylinder C2 and the third cylinder C3 are activated cylinders, and a four-cylinder mode M324 in which all of the first cylinder C1 to the fourth cylinder C4 are activated cylinders.

Then, in the two-cylinder mode M322 in which the first cylinder C1 and the fourth cylinder C4 are activated cylinders and the three-cylinder mode M323 in which the first cylinder C1, the fourth cylinder C4 and one of the second cylinder C2 and the third cylinder C3 are activated cylinders, each pertinent valve deactivation mechanism is controlled based on a control map in response to control parameters such as the oil temperature, engine speed and hydraulic pressure to carry out cylinder deactivation or cylinder activation as described hereinabove. Therefore, also in those modes, an output power shock when the valve deactivation mechanisms are driven to change the cylinder number can be reduced.

As described above, according to the present embodiment, the valve deactivation mechanism can be driven to reduce an output power shock when change of the cylinder number is carried out.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine which includes a valve deactivation mechanism driven by a hydraulic actuator which is driven by hydraulic pressure, comprising:
   a response delay time after a signal is sent to oil control valves until intake and exhaust valves are activated or deactivated is used to form a control map in response to control parameters;
   wherein said valve deactivation mechanism is controlled based on the control map.

2. The internal combustion engine which includes the valve deactivation mechanism according to claim 1, wherein the control parameters include the temperature of controlling oil, and the response delay time is calculated from the control map to delay the ignition timing or the fuel injection time.

3. The internal combustion engine which includes the valve deactivation mechanism according to claim 2, and further including an oil temperature sensor for detecting the temperature of oil within an oil path and a first hydraulic pressure sensor for detecting hydraulic pressure in the oil path, a second hydraulic pressure sensor for detecting hydraulic pressure within a controlling oil path and a third hydraulic pressure sensor for detecting hydraulic pressure in a second controlling oil path.

4. The internal combustion engine which includes the valve deactivation mechanism according to claim 1, wherein the control parameters include the pressure of controlling oil, and the response delay time is calculated from the control map to delay the ignition timing or the fuel injection time.

5. The internal combustion engine which includes the valve deactivation mechanism according to claim 1, wherein the control parameters include the engine speed, and the response delay time is calculated from the control map to delay the ignition timing or the fuel injection time.

6. The internal combustion engine which includes the valve deactivation mechanism according to claim 1, wherein the control parameters include the temperature of controlling oil and the pressure of the controlling oil or the engine speed, and the response delay time is calculated from the control map to delay the ignition timing or the fuel injection time.

7. The internal combustion engine which includes the valve deactivation mechanism according to claim 1, wherein valve deactivation mechanism is provided in a valve lifter and includes a lifter slidably movable upwardly and downwardly in an axial direction of the valve stem by a pressing force from a camshaft.

8. The internal combustion engine which includes the valve deactivation mechanism according to claim 7, wherein the valve deactivation mechanism includes a slide pin slidably movable in a direction substantially perpendicular to the axial direction of a valve stem end, a slide pin holder for holding the slide pin, a hydraulic feeding mechanism for causing hydraulic pressure to act upon the slide pin, a biasing member for biasing the slide pin against the hydraulic pressure applied to the slide pin and a biasing member for biasing the lifter against the pressure force from the camshaft.

9. The internal combustion engine which includes the valve deactivation mechanism according to claim 7, wherein the lifter is a cylindrical member with a top end in an axial direction formed as a flat face and open at a lower face thereof with a disk-like slide pin holder accommodated within the lifter.

10. The internal combustion engine which includes the valve deactivation mechanism according to claim 7, wherein the lifter is slidably mounted within a cylindrical lifter supporting portion provided at an upper portion of a rear cylinder head with an oil supplying groove formed on an inner circumference of the lifter supporting portion wherein the oil supplying groove surrounds the lifter.

11. A method for controlling an internal combustion engine including a valve deactivation mechanism driven by a hydraulic actuator which is driven by hydraulic pressure, comprising the following steps:
    sending a signal to oil control valves;
    determining a response delay time after the signal is sent to the oil control valves until intake and exhaust valves are activated or deactivated;
    establishing a control map in response to control parameters;
    controlling said valve deactivation mechanism based on the control map.

12. The method for controlling an internal combustion engine which includes the valve deactivation mechanism according to claim 11, wherein the control parameters include:
    determining the temperature of controlling oil, and
    calculating the response delay time from the control map to delay the ignition timing or the fuel injection time.

13. The method for controlling an internal combustion engine which includes the valve deactivation mechanism according to claim 12, and further including an oil temperature sensor for detecting the temperature of oil within an oil path and a first hydraulic pressure sensor for detecting hydraulic pressure in the oil path, a second hydraulic pressure sensor for detecting hydraulic pressure within a controlling oil path and a third hydraulic pressure sensor for detecting hydraulic pressure in a second controlling oil path.

14. The method for controlling an internal combustion engine which includes the valve deactivation mechanism according to claim 11, wherein the control parameters include:
    determining the pressure of controlling oil, and
    calculating the response delay time from the control map to delay the ignition timing or the fuel injection time.

15. The method for controlling an internal combustion engine which includes the valve deactivation mechanism according to claim 11, wherein the control parameters include:
    determining the engine speed, and
    calculating the response delay time from the control map to delay the ignition timing or the fuel injection time.

16. The method for controlling an internal combustion engine which includes the valve deactivation mechanism according to claim 11, wherein the control parameters include:
    determining the temperature of controlling oil;
    determining the pressure of the controlling oil or the engine speed, and
    calculating the response delay time from the control map to delay the ignition timing or the fuel injection time.

17. The method for controlling an internal combustion engine which includes the valve deactivation mechanism according to claim 11, wherein the valve deactivation mechanism is provided in a valve lifter and includes a lifter slidably movable upwardly and downwardly in an axial direction of the valve stem by a pressing force from a camshaft.

18. The method for controlling an internal combustion engine which includes the valve deactivation mechanism according to claim 17, wherein the valve deactivation mechanism includes a slide pin slidably movable in a direction substantially perpendicular to the axial direction of a valve stem end, a slide pin holder for holding the slide pin, a hydraulic feeding mechanism for causing hydraulic pressure to act upon the slide pin, a biasing member for biasing the slide pin against the hydraulic pressure applied to the slide pin and a biasing member for biasing the lifter against the pressure force from the camshaft.

19. The method for controlling an internal combustion engine which includes the valve deactivation mechanism according to claim 17, wherein the lifter is a cylindrical member with a top end in an axial direction formed as a flat face and open at a lower face thereof with a disk-like slide pin holder accommodated within the lifter.

20. The method for controlling an internal combustion engine which includes the valve deactivation mechanism according to claim 17, wherein the lifter is slidably mounted within a cylindrical lifter supporting portion provided at an upper portion of a rear cylinder head with an oil supplying groove formed on an inner circumference of the lifter supporting portion wherein the oil supplying groove surrounds the lifter.

* * * * *